United States Patent
Marker et al.

(10) Patent No.: US 12,122,962 B2
(45) Date of Patent: Oct. 22, 2024

(54) PROCESSES AND CATALYSTS FOR REFORMING OF IMPURE METHANE-CONTAINING FEEDS

(71) Applicant: Gas Technology Institute, Des Plaines, IL (US)

(72) Inventors: Terry Marker, Palos Heights, IL (US); Jim Wangerow, Oak Park, IL (US); Pedro Ortiz-Toral, Wheeling, IL (US); Martin Linck, Roscoe, IL (US)

(73) Assignee: GTI Energy, Des Plaines, IL (US)

( * ) Notice: Subject to any disclaimer, the term of this patent is extended or adjusted under 35 U.S.C. 154(b) by 748 days.

(21) Appl. No.: 16/514,677

(22) Filed: Jul. 17, 2019

(65) Prior Publication Data

US 2020/0087576 A1    Mar. 19, 2020

Related U.S. Application Data

(63) Continuation-in-part of application No. 16/134,623, filed on Sep. 18, 2018, now Pat. No. 11,111,142.

(51) Int. Cl.
| | |
|---|---|
| C10G 2/00 | (2006.01) |
| B01J 23/38 | (2006.01) |
| C01B 3/40 | (2006.01) |

(52) U.S. Cl.
CPC .............. *C10G 2/331* (2013.01); *B01J 23/38* (2013.01); *C01B 3/40* (2013.01);
(Continued)

(58) Field of Classification Search
CPC .. C10G 2/331; C10G 2300/1011; B01J 23/38; C01B 3/40; C01B 2203/0233; C01B 2203/0261; C01B 2203/1064
(Continued)

(56) References Cited

U.S. PATENT DOCUMENTS 3,449,078 A * 6/1969 Van Weeren ............. C01B 3/40
502/344
3,700,585 A   10/1972 Chen et al.
(Continued)

FOREIGN PATENT DOCUMENTS

| CN | 1184144 A | 6/1998 |
|---|---|---|
| CN | 102872905 A | 1/2013 |

(Continued)

OTHER PUBLICATIONS

Carbon Dioxide Reforming of Methane to Produce synthesis gas over metal-supported catalysts: State of the Art Shaobin Wang et al Energy and Fuels, V10, pp. 896-904 (Year: 1996).*
(Continued)

*Primary Examiner* — Colin W. Slifka
(74) *Attorney, Agent, or Firm* — Banner & Witcoff, Ltd.

(57) ABSTRACT

Processes and catalysts for producing hydrogen by reforming methane are disclosed, which afford considerable flexibility in terms of the quality of the reformer feed. This can be attributed to the robustness of the noble metal-containing catalysts described herein for use in reforming, such that a number of components commonly present in methane-containing process streams can advantageously be maintained without conventional upgrading (pretreating) steps, thereby improving process economics. This also allows for the reforming of impure reformer feeds, even in relatively small quantities, which may be characterized as complex gas mixtures due to significant quantities of non-methane components. A representative reforming catalyst comprises 1 wt-% Pt and 1 wt-% Rh as noble metals, on a cerium oxide support.

27 Claims, 2 Drawing Sheets

(52) U.S. Cl.
CPC .......... *C01B 2203/0233* (2013.01); *C01B 2203/0261* (2013.01); *C01B 2203/1064* (2013.01); *C10G 2300/1011* (2013.01)

(58) Field of Classification Search
USPC ...................................................... 423/648.1
See application file for complete search history.

(56) References Cited

U.S. PATENT DOCUMENTS

| | | | |
|---|---|---|---|
| 4,377,504 A | 3/1983 | Roberts et al. | |
| 4,594,468 A | 6/1986 | Minderhoud et al. | |
| 4,929,337 A | 5/1990 | Herbst et al. | |
| 5,023,276 A | 6/1991 | Yarrington et al. | |
| 5,336,655 A | 8/1994 | Basini et al. | |
| 5,468,368 A | 11/1995 | Baker, Jr. et al. | |
| 5,603,824 A | 2/1997 | Kyan et al. | |
| 5,741,440 A | 4/1998 | Cooper et al. | |
| 5,935,415 A * | 8/1999 | Haizmann | C10G 35/06 208/64 |
| 6,103,143 A | 8/2000 | Sircar et al. | |
| 6,303,098 B1 * | 10/2001 | Kramarz | C04B 35/453 252/373 |
| 6,348,278 B1 | 2/2002 | LaPierre et al. | |
| 7,132,042 B2 | 11/2006 | Genetti et al. | |
| 7,166,268 B2 | 1/2007 | Fukunaga | |
| 7,241,401 B2 | 7/2007 | Aasberg-Petersen et al. | |
| 8,303,848 B2 | 11/2012 | Morita et al. | |
| 9,127,222 B2 | 9/2015 | Bhattacharya et al. | |
| 9,677,005 B1 | 6/2017 | Agee et al. | |
| 10,106,753 B1 | 10/2018 | Graham et al. | |
| 2002/0024038 A1 | 2/2002 | Iijima et al. | |
| 2002/0025987 A1 | 2/2002 | Iijima et al. | |
| 2004/0013917 A1 | 1/2004 | Ukai et al. | |
| 2004/0166056 A1 | 8/2004 | Eyman et al. | |
| 2006/0074132 A1 | 4/2006 | Allam et al. | |
| 2006/0104896 A1 * | 5/2006 | Drnevich | C01B 3/56 423/648.1 |
| 2006/0182679 A1 | 8/2006 | Illinich et al. | |
| 2007/0167323 A1 | 7/2007 | Kobayashi | |
| 2007/0172416 A1 | 7/2007 | Kawashima et al. | |
| 2007/0286797 A1 * | 12/2007 | Behrens | B01J 6/008 423/644 |
| 2008/0237542 A1 | 10/2008 | Schmidt et al. | |
| 2009/0035192 A1 | 2/2009 | Hwang | |
| 2009/0108238 A1 | 4/2009 | Wagner et al. | |
| 2009/0221720 A1 * | 9/2009 | Belt | C01B 3/38 518/700 |
| 2009/0246118 A1 | 10/2009 | Drnevich et al. | |
| 2009/0294324 A1 | 12/2009 | Brandvold et al. | |
| 2009/0302275 A1 | 12/2009 | Chartier et al. | |
| 2009/0317669 A1 | 12/2009 | Hildebrandt et al. | |
| 2010/0280288 A1 | 11/2010 | Joshi et al. | |
| 2010/0325957 A1 | 12/2010 | Klockow et al. | |
| 2011/0015282 A1 | 1/2011 | Yagi et al. | |
| 2011/0120009 A1 | 5/2011 | Klockow et al. | |
| 2011/0120010 A1 | 5/2011 | Tiwari et al. | |
| 2011/0309000 A1 | 12/2011 | Tanaka et al. | |
| 2012/0010304 A1 | 1/2012 | Tasaka | |
| 2012/0208905 A1 | 8/2012 | Sato et al. | |
| 2013/0184501 A1 * | 7/2013 | Zhou | B01J 23/8993 568/885 |
| 2013/0305591 A1 | 11/2013 | McCall et al. | |
| 2014/0132028 A1 | 5/2014 | Yamada et al. | |
| 2014/0339475 A1 | 11/2014 | Moon et al. | |
| 2015/0104364 A1 | 4/2015 | Elomari | |
| 2015/0166913 A1 | 6/2015 | Brody et al. | |
| 2015/0218471 A1 | 8/2015 | Hannemann et al. | |
| 2016/0053187 A1 | 2/2016 | Hayasaka et al. | |
| 2016/0121305 A1 | 5/2016 | Kartick et al. | |
| 2016/0145508 A1 | 5/2016 | Xu et al. | |
| 2016/0152905 A1 * | 6/2016 | Kelfkens | C10G 3/00 518/704 |
| 2016/0186071 A1 | 6/2016 | Moon et al. | |
| 2016/0222303 A1 | 8/2016 | Gao et al. | |
| 2016/0272895 A1 | 9/2016 | Wakamatsu et al. | |
| 2016/0311684 A1 | 10/2016 | Milanov et al. | |
| 2016/0362611 A1 | 12/2016 | Harris et al. | |
| 2017/0001176 A1 | 1/2017 | D'Souza et al. | |
| 2017/0183583 A1 | 6/2017 | Ide et al. | |
| 2017/0274342 A1 | 9/2017 | Galloway et al. | |
| 2018/0269493 A1 | 9/2018 | Nam et al. | |
| 2019/0233350 A1 | 8/2019 | Sankaranarayanan et al. | |
| 2021/0292666 A1 | 9/2021 | Greager et al. | |

FOREIGN PATENT DOCUMENTS

| | | | |
|---|---|---|---|
| CN | 106475096 A | | 3/2017 |
| EP | 1852181 A1 | | 11/2007 |
| EP | 1920830 A1 | | 5/2008 |
| EP | 2308594 A2 | | 4/2011 |
| EP | 2944606 A1 | | 11/2015 |
| GB | 2247465 A | | 3/1992 |
| GB | 2247465 | * | 4/1992 |
| JP | S6126693 A | | 2/1986 |
| JP | H0631321 A | | 2/1994 |
| JP | H08231204 A | | 9/1996 |
| JP | 2000104078 A | | 4/2000 |
| JP | 2007016090 A | | 1/2007 |
| JP | 4132295 B2 | | 8/2008 |
| JP | 4934444 B2 | | 8/2008 |
| JP | 2009242158 A | | 10/2009 |
| JP | 2011127014 A | | 6/2011 |
| JP | 2014511940 A | | 5/2014 |
| JP | 2017007872 A | | 1/2017 |
| KR | 20030061395 A | | 7/2003 |
| RU | 2415904 | | 5/2010 |
| RU | 2453366 C1 | | 6/2012 |
| WO | 2012069821 A1 | | 5/2012 |
| WO | 2014014818 A1 | | 1/2014 |
| WO | 2014132028 A1 | | 9/2014 |
| WO | 2014195904 A1 | | 12/2014 |
| WO | 2015099577 A1 | | 7/2015 |
| WO | 2015/183200 A1 | | 12/2015 |
| WO | WO2016087976 | * | 6/2016 |
| WO | 2016111411 A1 | | 7/2016 |
| WO | 2016162866 A1 | | 10/2016 |

OTHER PUBLICATIONS

Jan. 28, 2021—(WO) International Search Report—App PCT/2017/061787—Eng Trans.

Jan. 28, 2021—(RU) Office Action—App No. 2020119423—English Version, citing Moskvichev, Yu A., (2016) and providing a concise explanation of relevance under 37 CFR 1.98(a)(3)(i) and MPEP 609.04(a)(III).

Lavoie, Jean-Michel, Review on dry reforming of methane, a potentially more environmentally-friendly approach to the increasing natural gas exploitation, Frontiers in Chemistry, v. 2, aet. 81, pp. 1-17, (2014).

Ozkara-Aydinoglu, Seyma, Thermodynamic equilibrium analysis of combined carbon dioxide reforming with steam reforming of methane to synthesis gas, International Journal of Hydrogen Energy 35, pp. 12821-12828, (2010).

Moskvichev, Yu A., 3 pages (2016) [concise statement of relevance under 37 CFR 1.98(a)(3)(i) and MPEP 609.04 (a)(III) in the English translation of the RU Office Action, cited above ].

Sun Y. et al., Thermodynamic analysis of mixed and dry reforming of methane for solar thermal applications, Journal of Natural Gas Chemistry 20, pp. 568-576 (2011).

M. Garcia-Diéguez et al., RhNi nanocatalysts for the CO2 and CO2 + H2O reforming of methane, Catalysis Today 172, pp. 136-142 (2011).

Souza, Mariana M.V.M., et al., Autothermal reforming of methane over Pt/ZrO2/Al2O3 catalysts, Applied Catalysis A: General 281, pp. 19-24 (2005).

Dec. 12, 2023—(EP) Partial European Search Report—App EP23196545.0.

(56) References Cited

OTHER PUBLICATIONS

Feb. 19, 2024—(EP) Extended European Search Report and Search Opinion—App EP23203968.5.

* cited by examiner

PROCESSES AND CATALYSTS FOR REFORMING OF IMPURE METHANE-CONTAINING FEEDS

CROSS-REFERENCE TO RELATED APPLICATIONS

This application is a continuation-in-part of U.S. patent application Ser. No. 16/134,623, filed Sep. 18, 2018, now U.S. Pat. No. 11,111,142, which is hereby incorporated by reference in its entirety.

STATEMENT REGARDING FEDERALLY SPONSORED RESEARCH OR DEVELOPMENT

This invention was made with government support under U.S. Department of Energy Award DE-EE-0007009. The government has certain rights in the invention.

FIELD OF THE INVENTION

Aspects of the invention relate to processes for the reforming of methane for hydrogen production, in which the methane is present in a reformer feed, in combination with one or both of CO and $CO_2$ and optionally further components. Further aspects relate to reforming catalysts comprising one or more noble metals for use in such processes.

DESCRIPTION OF RELATED ART

Significant quantities of hydrogen are demanded in the chemical production and petroleum refining industries. For example, in chemical production, hydrogen is used as a reactant with nitrogen via the Haber process to produce ammonia. This intermediate can then be converted to ammonium nitrate, a valuable component of soil fertilizer. In refining, hydrogen is essential for upgrading hydrocarbon fractions derived from crude oil, according to a number of hydroprocessing operations. These include hydrocracking to reduce hydrocarbon molecular weight and yield desirable transportation fuels (e.g., gasoline), as well as hydrotreating to remove unwanted contaminants such as sulfur- and nitrogen-containing compounds. Particularly in view of the increasing need for low sulfur fuels due to environmental concerns, the use of hydrogen in refineries is expected to grow.

A number of different approaches for hydrogen production are currently being investigated, and these include biomass pyrolysis and gasification, in addition to biological processes, such as bacterial fermentation and enzymatic hydrogen production. Electrolysis is another technology for making hydrogen in which water is decomposed into oxygen and hydrogen. Currently, however, the commercial production of hydrogen is based on the oxidation of methane according to a process known as steam methane reforming (SMR), in which water ($H_2O$) is used as the oxidant, according to the reaction:

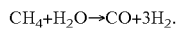
$CH_4+H_2O \rightarrow CO+3H_2$.

Other avenues being considered with respect to the reforming of methane include partial oxidation reforming and autothermal reforming (ATR), based on the exothermic oxidation of methane with oxygen. More recently, it has also been proposed to use carbon dioxide ($CO_2$) as the oxidant for methane, such that hydrogen is produced by the reaction of carbon in its most oxidized form with carbon in its most reduced form, according to:

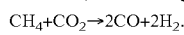
$CH_4+CO_2 \rightarrow 2CO+2H_2$.

This reaction has been termed the "dry reforming" of methane, and because it is highly endothermic, thermodynamics for the dry reforming of methane are less favorable compared to ATR or even SMR.

In conventional SMR, the hydrogen-containing product from the reforming reaction is subjected to one or more water-gas shift (WGS) reactions, for example performed in separate reactors at high and low temperatures, to convert carbon monoxide and residual steam in this product to carbon dioxide and additional hydrogen. The hydrogen in the resulting WGS product can then be purified and recovered using a gas separation step that incorporates a membrane, or, more commonly, a solid adsorbent as in the case of pressure swing adsorption (PSA). Suitable adsorbents include zeolites and non-zeolitic molecular sieves, as well as activated carbon. In PSA, such materials preferentially adsorb impurities such as CO and $CO_2$ at high pressure, allowing purified hydrogen to pass through the adsorbent, before pressure is reduced in the normal PSA cycle to desorb the impurities and regenerate the adsorbent. The impurities are therefore preferentially separated, from the purified hydrogen, in what is often referred to as a purge gas, or more specifically a "PSA tail gas." Some hydrogen is present in the PSA tail gas or the purge gas from another type of gas separation step, due to its incomplete recovery in the purified hydrogen, which varies as a function of the purity of this product. Because of its heating value, the PSA tail gas or other type of purge gas is normally combusted.

Whereas nickel-based catalysts have shown effectiveness in SMR and are likewise proposed for use in the reforming of methane using other oxidants, namely oxygen and $CO_2$ as described above, these catalysts are quite sensitive to non-methane components that are often present in natural gas or other methane-containing gas streams that could be candidates for reforming. As a result of this sensitivity, a number of processing steps are normally required prior to (upstream) of the reforming reactor, in order to eliminate, or at least mitigate the concentration of, components that are detrimental to the performance of conventional reforming catalysts. For example, olefinic hydrocarbons such as ethylene and propylene are reactive and lead to the rapid deactivation of these catalysts by coking, a phenomenon that refers to the deposition of carbonaceous byproducts on the catalyst surface to block active sites. For this reason, a hydrotreating step is normally used to saturate olefinic hydrocarbons to their corresponding paraffinic hydrocarbons, such as ethane and propane. The presence of CO is desirably minimized, also due to its potential contribution to catalyst coking, and the pretreating steps typically undertaken with respect to this component involve the use of a WGS reaction to convert CO to $CO_2$, followed by acid gas removal (e.g., amine scrubbing) to capture the generated $CO_2$. Furthermore, higher paraffinic hydrocarbons, such as ethane or propane generated from hydrotreating as described above and/or otherwise present in the initial methane-containing gas stream, have a tendency to crack to olefinic hydrocarbons in the reforming reactor, posing another possible route to catalyst coking. To address this, a pre-reformer is used upstream of the reforming reactor, to initially convert these components to $H_2$ and CO.

Overall, conventional reforming catalysts are unable to perform with acceptable stability, in the case of processing significant concentrations of components other than methane, which components are nonetheless commonly present in methane-containing process streams. As a result, quality specifications for reformer feeds are quite strict and are achieved only through the use of a number of pretreating steps as described above. This greatly adds to the expense of conventional hydrogen production via SMR and reforming in general, such that the processing of many types of methane-containing gas streams, which may be available in relatively small quantities compared to natural gas, becomes cost-prohibitive in the absence of a sufficient economy of scale. The art would therefore benefit greatly from the ability to economically reform complex gas mixtures containing methane and other components including CO, olefinic and/or higher paraffinic hydrocarbons, etc. Examples of such mixtures are obtained from biomass processing to produce renewable fuels, such as biogas and effluents of gasification or pyrolysis processes.

SUMMARY OF THE INVENTION

Aspects of the invention are associated with the discovery of processes and catalysts for producing hydrogen by reforming methane, which afford considerable flexibility in terms of the quality of the reformer feed. In view of the robustness of the noble metal-containing catalysts described herein for use in reforming, a number of components commonly present in methane-containing process streams can advantageously be maintained in the reformer feed, thereby improving process economics. In some cases, quantities of these non-methane components may be significant. This allows for the reforming of relatively small quantities of impure reformer feeds, which would be cost-prohibitive using conventional technologies that require a significantly larger scale of operation for feasibility.

Further aspects are associated with hydrogen production processes by methane reforming, in which one or more conventional upgrading or pretreating steps, upstream of the reforming reactor, are advantageously avoided. Yet further aspects are associated with the reforming of process streams comprising renewable methane (obtained from a renewable carbon source), together with quantities of other components (e.g., CO and $CO_2$) normally present in such streams, to generate hydrogen. In some cases, this hydrogen may be utilized in the same process from which this process stream is generated. For example, the process stream may be an effluent from a renewable hydrocarbon fuel (biofuel) production process (e.g., a pyrolysis process, such as a hydropyrolysis processes, or a fatty acid/triglyceride hydroconversion processes), which utilizes the generated hydrogen. Still further aspects of the invention are associated with simplified hydrogen production processes, which may be performed on a small scale. For example, the associated equipment may be provided as a compact, or even portable, system, such as a skid mounted system.

These and other embodiments, aspects, and advantages relating to the present invention are apparent from the following Detailed Description.

BRIEF DESCRIPTION OF THE DRAWINGS

A more complete understanding of the exemplary embodiments of the present invention and the advantages thereof may be acquired by referring to the following description in consideration of the accompanying figures.

Figure 1:
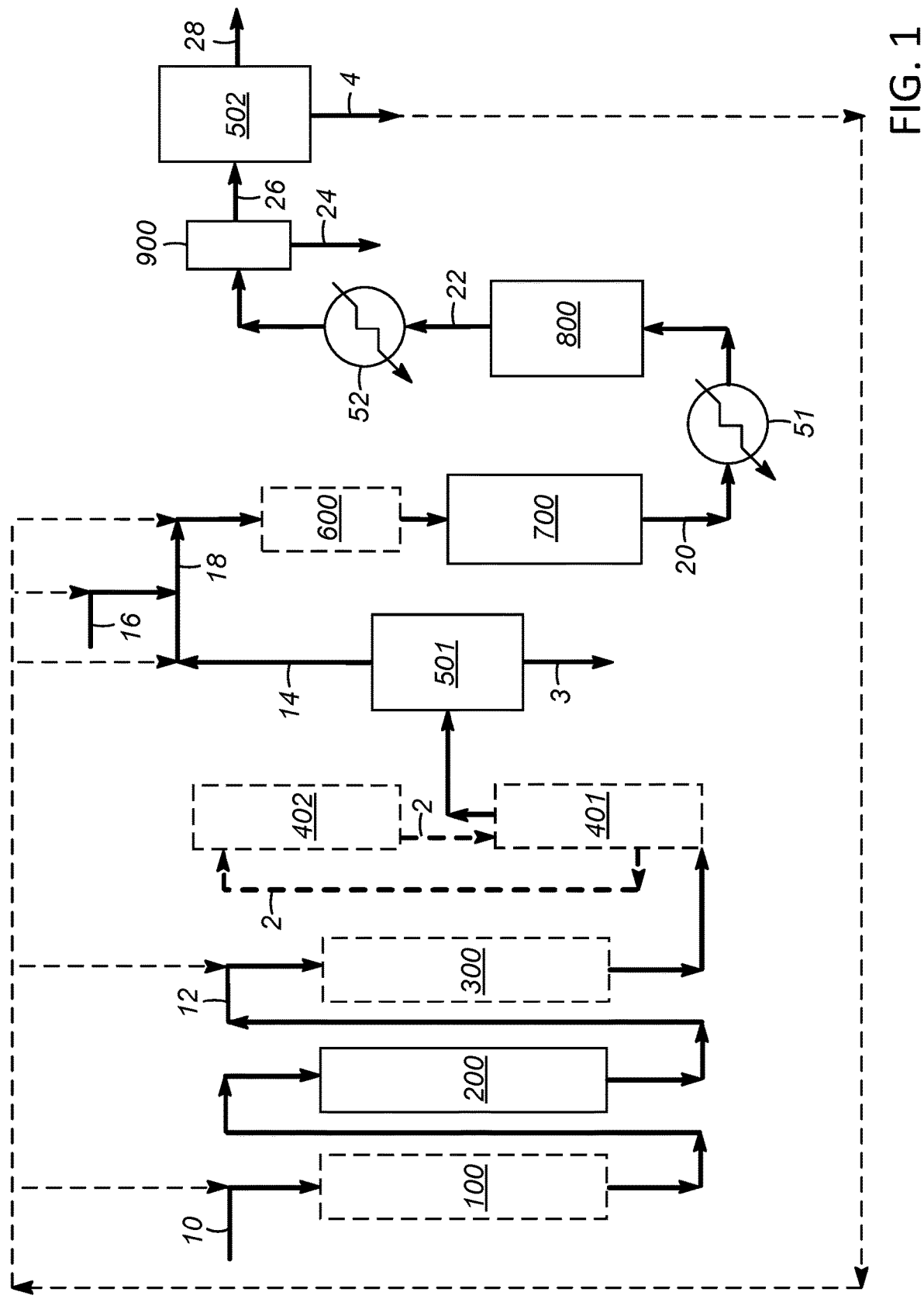
FIG. 1 depicts a flowscheme, illustrating a process for producing hydrogen by reforming, in which certain processing steps upstream of the reforming reactor and illustrated using dashed lines may be avoided.

The figures should be understood to present simplified illustrations, with the understanding that the elements shown are not necessarily drawn to scale. Heat exchangers, separators and other auxiliary equipment and systems, including pumps, valves, and instrumentation, not essential to the understanding of the various aspects of the invention are not shown. As is readily apparent to one of skill in the art having knowledge of the present disclosure, processes for reforming of methane contained in a reformer feed will have configurations and elements governed, in part, by the specific implementation of the invention. The same reference numbers are used in the figures to identify the same or similar features.

DETAILED DESCRIPTION

The expressions "wt-%" and "mol-%," are used herein to designate weight percentages and molar percentages, respectively. The expressions "wt-ppm" and "mol-ppm" designate weight and molar parts per million, respectively. For ideal gases, "mol-%" and "mol-ppm" are equal to percentages by volume and parts per million by volume, respectively.

The term "reformer feed" refers to a methane-containing gas that may comprise other components such as CO and/or $CO_2$ and that is subjected to reforming, whereby at least a portion of the methane in this gas is reacted with an oxidant to produce hydrogen that is present in a reformer product. All or a portion of the oxidant, for example in the case of steam ($H_2O$), may be present in a separate oxidant-containing (e.g., steam-containing) feed that is combined with the reformer feed prior to or upstream of the reforming. Alternatively, the oxidant (e.g., $H_2O$ and/or $CO_2$) may be present in a sufficient quantity in the reformer feed (e.g., "as received" from a separate process such as a biofuel production process), such that no separate oxidant-containing feed is needed. The reformer feed, or any combined feed resulting from combining this feed with an oxidant-containing feed, such as a steam-containing feed, and/or other feed, is in general completely or at least predominantly in the gas phase under reforming conditions, including the temperatures and pressures described herein as being suitable for the reforming of methane to produce hydrogen. The reformer feed or combined feed may include components such as water that are liquid under conditions of ambient temperature and pressure. Other examples of such components are hydrocarbons found in liquid fuels including naphtha and jet fuels, for example $C_6$-$C_{16}$ hydrocarbons.

The characteristics of reformer feeds and combined feeds, described herein, including characteristics pertaining to their compositions, are likewise applicable to any "process stream" described herein, which may provide some or all of a given reformer feed or combined feed, for example following pretreatment for sulfur removal and/or hydrogen separation.

Unless otherwise specified, the term "substantially" means "to at least a 95% extent." Therefore, for example, "substantially all" means "at least 95%."

Reformer Feeds and Combined Feeds

Embodiments of the invention are directed to a process for producing hydrogen, the process comprising contacting, under reforming conditions, a reformer feed, or combined feed, comprising methane with a reforming catalyst as described herein. This provides a reformer product or effluent comprising hydrogen that is produced from reforming of at least a portion of the methane by reaction with an oxidant, such as a stoichiometric amount of $H_2O$ and/or $CO_2$. In addition to methane, the reformer feed or combined feed comprises one or both, and preferably both, of CO and $CO_2$. For example, CO and/or $CO_2$ may be independently present in the reformer feed or combined feed in a concentration of at least about 0.5 mol-% (e.g., from about 0.5 mol-% to about 20 mol-%), at least about 1 mol-% (e.g., from about 1 mol-% to about 15 mol-%), or at least about 3 mol-% (e.g., from about 3 mol-% to about 10 mol-%). For illustrative purposes, in a specific case of CO and/or $CO_2$ being independently present in the reformer feed or combined feed in these concentrations, (i) CO may be present in a concentration from about 0.5 mol-% to about 20 mol-%, (ii) $CO_2$ may be present in a concentration from about 1 mol-% to about 15 mol-%, or both (i) and (ii). The reformer feed or combined feed may comprise CO and $CO_2$ in a total (combined) concentration, for example, of at least about 0.5 mol-% (e.g., from about 0.5 mol-% to about 35 mol-%), at least about 1 mol-% (e.g., from about 1 mol-% to about 25 mol-%), or at least about 5 mol-% (e.g., from about 5 mol-% to about 15 mol-%). In the case of processes for the dry reforming of methane and/or other hydrocarbons using $CO_2$ as an oxidant, optionally in combination with using $H_2O$ as an oxidant, the reformer feed or combined feed may comprise a significant concentration $CO_2$, such as at least about 35 mol-% (e.g., from about 35 mol-% to about 70 mol-%) or at least about 40 mol-% (e.g., from about 40 mol-% to about 60 mol-%). The $CO_2$ may be present at a concentration that provides at least about 80%, or at least about 95%, of the stoichiometric requirement for converting methane and/or other hydrocarbons in the feed by dry reforming. For example, in the case of a reformer feed or combined feed comprising methane, $CO_2$ may be present at a concentration that provides a number of moles that is at least about 80%, or at least about 95%, of the number of moles of methane, in view of $CO_2$ and methane reacting in a 1:1 molar ratio according to the dry reforming reaction. In a specific embodiment, the reformer feed or combined feed may have a $CO_2:CH_4$ molar ratio from about 0.8 to about 1.5, such as from about 0.9 to about 1.2, optionally in combination with a $CO_2$ concentration as described above (e.g., at least about 35 mol-%). An exemplary reformer feed or combined feed used in a dry reforming process may comprise about 50 mol-% $CO_2$ and about 50 mol-% $CH_4$.

Advantageously, noble metal-containing reforming catalysts as described herein can tolerate significant concentrations of CO and/or $CO_2$, without a loss in stability comparable to that observed with respect to conventional nickel-based reforming catalysts or other known catalysts having acidity that can promote coking and deactivation. For example, significant quantities of silicon (e.g., in the form of silica) in catalyst support materials can provide an undesired level of acidity, such as in the case of silicated inorganic oxide, including silicated magnesium oxide, support materials. The comparably high stability of reforming catalysts as described herein can reduce or even obviate the need for conventional upgrading or pretreating steps, prior to reforming, such as steps involving subjecting the reformer feed to a water-gas shift (WGS) reaction and/or $CO_2$ removal. Tolerance to hydrocarbons other than methane in the reformer feed is yet a further advantage of noble metal-containing reforming catalysts, in this case potentially reducing or even obviating the need for other upstream pretreating steps, such as hydrotreating to convert olefinic hydrocarbons to paraffinic hydrocarbons and/or pre-reforming of paraffinic hydrocarbons, both of which are conventionally practiced in hydrogen production by SMR.

Therefore, the reformer feed or combined feed may, according to representative embodiments, comprise one or more hydrocarbons other than methane, such as any one or more of ethane ($C_2H_6$), ethylene ($C_2H_4$), propane ($C_3H_5$), propylene ($C_3H_6$), butane ($C_4H_{10}$) and its structural isomers (e.g., n-butane and/or i-butane), butene ($C_4H_5$) and its structural and positional isomers (e.g., 1-butene, 2-butene, and/or isobutylene), pentane ($C_5H_2$) and its structural isomers, pentene ($C_5H_{10}$) and its structural and positional isomers, and higher molecular weight hydrocarbons ($C_6^+$ hydrocarbons). For example, the reformer feed or combined feed may comprise, in addition to methane, one or both of (i) one or more $C_2$ paraffinic hydrocarbons, such as ethane, propane, butane, pentane, and/or $C_6^+$ paraffinic hydrocarbons and (ii) one or more $C_2$ olefinic hydrocarbons, such as ethylene, propylene, butene, pentene, and/or $C_6^+$ olefinic hydrocarbons. In one embodiment, the reformer feed or combined feed may comprise one or more $C_2$ paraffinic hydrocarbons, selected from the group consisting of ethane, propane, butane, pentane, and combinations of these. In the reformer feed or combined feed, any of these paraffinic hydrocarbons, or combination of paraffinic hydrocarbons, may be present, for example, in a concentration, or total (combined) concentration, of at least about 1 mol-% (e.g., from about 1 mol-% to about 35 mol-%), such as at least about 3 mol-% (e.g., from about 3 mol-% to about 20 mol-%). In another embodiment, the reformer feed or combined feed may comprise one or more $C_2$ olefinic hydrocarbons, selected from the group consisting of ethylene, propylene, butene, pentene, and combinations of these. Any of these olefinic hydrocarbons, or combination of olefinic hydrocarbons, may be present, for example, in a concentration, or total (combined) concentration, of at least about 0.3 mol-% (e.g., from about 0.3 mol-% to about 15 mol-%), such as at least about 1 mol-% (e.g., from about 1 mol-% to about 10 mol-%). In general, any one or more hydrocarbons other than methane may be present in the reformer feed or combined feed in a concentration, or in a total (combined) concentration, of at least about 3 mol-% (e.g., from about 3 mol-% to about 45 mol-%), such as at least about 5 mol-% (e.g., from about 5 mol-% to about 30 mol-%).

According to more particular embodiments, the reformer feed or combined feed may comprise ethane and/or propane. For example, ethane or propane may be independently present in the reformer feed or combined feed in a concentration of at least about 1 mol-% (e.g., from about 1 mol-% to about 20 mol-%) or at least about 3 mol-% (e.g., from about 3 mol-% to about 12 mol-%). The reformer feed or combined feed may comprise ethane and propane in a total (combined) concentration, for example, of at least about 2 mol-% (e.g., from about 2 mol-% to about 35 mol-%) or at least about 5 mol-% (e.g., from about 5 mol-% to about 25 mol-%), such as in the case of a reformer feed or combined feed comprising an effluent from a renewable hydrocarbon fuel (biofuel) production process. According to other particular embodiments, the reformer feed or combined feed may comprise ethane and/or ethylene. For example, ethane or ethylene may be independently present in the reformer feed or combined feed in a concentration of at least about 0.5 mol-% (e.g., from about 0.5 mol-% to about 15 mol-%) or at least about 1 mol-% (e.g., from about 1 mol-% to about 10 mol-%). The reformer feed or combined feed may comprise ethane and ethylene in a total (combined) concentration, for example, of at least about 3 mol-% (e.g., from about 3 mol-% to about 30 mol-%) or at least about 5 mol-% (e.g., from about 5 mol-% to about 20 mol-%), such as in the case of a reformer feed or combined feed comprising a refinery fuel gas.

As described above, steam ($H_2O$) may be used as an oxidant in a given hydrogen production process and thereby used to react with at least a portion, representing a stoichiometric amount, of the methane in the reformer feed. Sufficient $H_2O$ may be present in the reformer feed, or, alternatively, prior to or upstream of the reforming (contacting of the reformer feed with the reforming catalyst), the reformer feed may be combined with a separate steam-containing feed comprising at least a portion, and possibly all or substantially all, of the $H_2O$ that is introduced to the reforming reactor (or introduced to the process generally). The combined feed, in this case a combination of the reformer feed and steam-containing feed, comprises the $H_2O$ used for reforming of at least a portion of the methane also present in this combined feed, which methane may typically be obtained substantially or entirely from the reformer feed. The total amount of $H_2O$ in the reformer feed or combined feed, however, normally includes a stoichiometric excess that remains unreacted and that may be recovered from the reformer product or effluent. In one embodiment, for example, this product or effluent may be subjected to a WGS reaction to convert at least a portion of its CO and $H_2O$ content to additional $H_2$, to provide a WGS product having an increased $H_2$ concentration, relative to the reformer product or effluent. Thereafter water may be condensed from the WGS product, providing a water-depleted WGS product having, for example, an $H_2$ concentration of at least about 60 mol-% (e.g., from about 60 mol-% to about 95 mol-%) or at least about 70 mol-% (e.g., from about 70 mol-% to about 90 mol-%). Therefore, it can be appreciated that the WGS product may comprise $H_2$ in these same concentrations, on a water-free basis. In another embodiment, this reformer product, insofar as it is a gaseous mixture comprising both $H_2$ and CO, which may therefore be termed a "synthesis gas product" or "syngas," may be processed downstream of the reforming reactor via the Fischer-Tropsch (FT) reaction to produce liquid hydrocarbons (e.g., having boiling points characteristic of gasoline, diesel fuel, and/or jet fuel) and/or alcohols.

A stoichiometric excess of $H_2O$ in the reformer feed, or combined feed, which is subjected to reforming, promotes a high level of conversion of methane and other hydrocarbons to hydrogen, according to the general reaction below in which 1-120 is used as an oxidant. One measure of this excess may be expressed as the steam/carbon molar ratio, in which the moles of carbon in the denominator refers to the carbon in hydrocarbons and not CO or $CO_2$. In representative embodiments, the reformer feed or combined feed has a steam/carbon molar ratio of at least about 2.0 (e.g., from about 2.0 to about 4.5) or at least about 2.5 (e.g., from about 2.5 to about 3.5). To the extent that the steam/carbon molar ratio is characteristic of the inlet of the reforming reactor, an inlet steam/carbon molar ratio in these ranges represents a reforming condition, among other reforming conditions as described below. In the case of steam reforming, methane and higher alkane hydrocarbons are converted to hydrogen according to the general reaction:

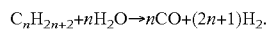

However, in the case of a reformer feed or combined feed that further comprises $CO_2$, for example in a concentration as described above, at least a portion of this component may also react with hydrocarbons to produce additional hydrogen, according to the dry reforming reaction in which methane and higher alkane hydrocarbons are converted according to the general reaction:

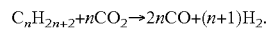

In preferred embodiments a combination of $H_2O$ and $CO_2$ and can serve as the oxidant for reforming, such that portions of the $H_2$ in the reformer product are generated from both steam reforming and dry reforming. In yet further embodiments the oxidant for reforming may be predominantly, substantially all, or all $CO_2$, for example in the case of the reformer feed or combined feed having a significant $CO_2$ concentration as described above (e.g., at least about 35 mol-%) and a relatively lower $H_2O$ concentration (e.g., less than about 10 mol-%, less than about 5 mol-%, or less than about 1 mol-%). For example, $H_2O$ may be present in the reformer feed or combined feed at a small concentration within these ranges, for the main purpose of inhibiting coking of the reforming catalyst.

Representative reformer feeds and combined feeds, described herein, may therefore comprise significant concentrations of components other than methane, such as CO, $CO_2$, and hydrocarbons (either paraffinic or olefinic, and often both). Advantageously, conventional pretreatment steps used to mitigate concentrations of such other components upstream of the reforming reactor, in order to protect conventional reforming (e.g., nickel-based) catalysts from performing unacceptably in terms of the rate of activity decline, i.e., in terms of stability, can be reduced in their severity and/or performance requirements, or otherwise eliminated altogether. Further components other than methane, in certain reformer feeds and combined feeds, include $H_2$ and $H_2O$, although it is often desired to reduce the concentration of the former by its separation from a process stream, upstream of the reforming reactor. For example, a hydrogen separation step may be performed using an adsorbent-based system, in the case of pressure swing adsorption (PSA), or otherwise using a membrane-based system. A particular step of separating hydrogen prior to the reforming reactor is known as rapid cycle pressure swing adsorption (RCPSA). By separating hydrogen, the total gas flow through the reforming reactor is reduced and a more favorable equilibrium for hydrogen production in this reactor is established. Whether or not upstream hydrogen separation is employed, the reformer feed, or combined feed, may comprise $H_2$ in a concentration of at least about 2 mol-% (e.g., from about 2 mol-% to about 20 mol-%) or at least about 5 mol-% (e.g., from about 5 mol-% to about 15 mol-%). The reformer feed or combined feed may comprise $H_2O$ in a concentration of at least about 10 mol-% (e.g., from about 10 mol-% to about 85 mol-%) or at least about 45 mol-% (e.g., from about 45 mol-% to about 75 mol-%).

In view of the possible concentrations of components other than methane, as described herein, the reformer feed or combined feed may, in some embodiments, comprise only a minor concentration (e.g., less than about 50 mol-%) of methane. For example, the reformer feed or combined feed may comprise methane in a concentration of less than about 40 mol-% (e.g., from about 5 mol-% to about 40 mol-%) or less than about 25 mol-% (e.g., from about 10 mol-% to about 25 mol-%). Advantageously, due to the reduced requirements for pretreating that are made possible using noble metal-containing reforming catalysts as described herein, reformer feeds or combined feeds having only minor concentrations of methane can be economically utilized for hydrogen production, rather than merely for combustion to recover heating (fuel) value. In other embodiments, the reformer feed or combined feed may comprise methane at a concentration, for example of greater than about 35 mol-% (e.g., from about 35 mol-% to about 95 mol-%) or greater than about 45 mol-% (e.g., from about 45 mol-% to about 75 mol-%). With respect to any of the above ranges given for the methane concentration in the reformer feed or combined feed, at least about 80%, at least about 90%, or substantially all, of the balance may be one or both of the oxidants $H_2O$ and/or $CO_2$.

Further impacting the composition of representative reformer feeds, or combined feeds, is the fact that catalysts as described herein exhibit sulfur tolerance. This is particularly advantageous, for example, in the case of such feeds comprising or being derived from natural gas that, depending on its source, may contain $H_2S$ or other sulfur-bearing components (e.g., mercaptans). In general, the reformer feed or combined feed may comprise at least about 1 mole-ppm (e.g., from about 1 mol-ppm to about 1 mol-%) total sulfur (e.g., present as $H_2S$ and/or other sulfur-bearing components), such as at least about 3 mol-ppm (e.g., from about 3 mol-ppm to about 5000 mol-ppm) of total sulfur, at least about 10 mol-ppm (e.g., from about 10 mol-ppm to about 1000 mol-ppm), or at least about 100 mol-ppm (e.g., from about 100 mol-ppm to about 1000 mol-ppm).

Reforming Catalysts

Aspects of the invention relate to reforming processes to produce hydrogen, by contacting a reformer feed or combined feed described herein (e.g., comprising methane and optionally other hydrocarbon(s)) with a reforming catalyst. This contacting may be performed batchwise, but preferably is performed continuously, with a continuous flow of the reformer feed or combined feed to the reforming reactor and continuous withdrawal from this reactor of the reformer product comprising hydrogen produced from reforming at least a portion of the methane by reaction with an oxidant (e.g., $H_2O$ or a combination of $H_2O$ and $CO_2$).

As described above, aspects of the invention are associated with the discovery of reforming catalysts exhibiting important advantages, particularly in terms of tolerance to non-methane components of the reformer feed or combined feed as described herein, including CO and $C_2$ hydrocarbons (both paraffinic and olefinic), compared to conventional reforming catalysts. These characteristics, in turn, reduce the significant pretreating requirements of conventional processes and thereby improve flexibility, in terms of economically producing hydrogen, even on a relatively small operating scale, from common process streams containing significant concentrations of such non-methane components. Improvements in the stability of catalysts described herein may be attributed at least in part to their high activity, which manifests in lower operating (reactor or catalyst bed) temperatures. This, in turn, contributes to a reduced rate of the formation and deposition of coke on the catalyst surface and extended, stable operation. According to particular embodiments, processes utilizing catalysts described herein can maintain stable operating parameters, for example in terms of hydrocarbon conversion (e.g., at least about 85% conversion of methane and/or other hydrocarbon(s)) under constant operating conditions (including composition of the reformer feed or combined feed), for at least about 100, at least about 300, or even at least about 500, hours of continuous or possibly discontinuous operation. This may be an operating period over which (i) the reforming catalyst does not undergo regeneration, for example according to a reforming process utilizing the catalyst as a fixed bed within the reforming reactor and/or (ii) the temperature of the reforming reactor or catalyst bed is not raised beyond a threshold temperature difference from the start of the time period to the end of the time period, with this threshold temperature difference being, for example, 100° C. (180° F.), 50° C. (90° F.), 25° C. (45° F.), 10° C. (18° F.), or even 5° C. (9° F.).

Representative reforming catalysts suitable for catalyzing the reaction of methane and/or other hydrocarbon(s) with an oxidant (e.g., 1-120 or a combination of 1-120 and $CO_2$) comprise a noble metal, and possibly two, or even more than two, noble metals, on a solid support. The solid support may comprise cerium oxide, or, more particularly, cerium oxide in combination with a suitable binder (e.g., alumina) in a suitable amount (e.g., from about 5 wt-% to about 35 wt-%) to impart mechanical strength.

The phrase "on a solid support" is intended to encompass catalysts in which the active metal(s) is/are on the support surface and/or within a porous internal structure of the support. The solid support preferably comprises a metal oxide, with cerium oxide being of particular interest. Cerium oxide may be present in an amount of at least about 60 wt-% and preferably at least about 75 wt-%, based on the weight of the solid support (e.g., relative to the total amount(s) of metal oxide(s) in the solid support). Whether or not in oxide form, cerium may be present in an amount from about 30 wt-% to about 80 wt-%, and preferably from about 40 wt-% to about 65 wt-%, of the catalyst. The solid support may comprise all or substantially all (e.g., greater than about 95 wt-%) cerium oxide, or otherwise all or substantially all (e.g., greater than about 95 wt-%) cerium oxide and a second metal oxide (e.g., aluminum oxide) that acts as a binder. One or more of other metal oxides, such as aluminum oxide, silicon oxide, titanium oxide, zirconium oxide, magnesium oxide, calcium oxide, iron oxide, vanadium oxide, chromium oxide, nickel oxide, tungsten oxide, strontium oxide, etc., may also be present, independently in individual amounts, or otherwise in combined amounts in the case of two or more of such other metal oxides, representing a minor portion, such as less than about 50 wt-%, less than about 30 wt-%, less than about 10 wt-%, or less than about 5 wt-%, of the solid support. Preferably, one or more of silicon oxide, titanium oxide, zirconium oxide, magnesium oxide, calcium oxide, iron oxide, vanadium oxide, chromium oxide, nickel oxide, tungsten oxide, and strontium oxide is substantially absent in the solid support. For example, these metal oxides may be present, independently in individual amounts, or otherwise in combined amounts in the case of two or more of such other metal oxides, of less than about 3 wt-%, less than about 0.5 wt-%, or even less than about 0.1 wt-%, of the solid support. For illustrative purposes, in specific embodiments, (i) silicon oxide (silica) may be present in an amount of less than about 0.5 wt-% of the solid support, (ii) nickel oxide may be present in amount of less than about 0.5 wt-% of the solid support, (iii) silicon oxide and nickel oxide may be present in a combined amount of less than about 0.5 wt-% of the solid support. In other embodiments, the solid support may comprise one or more of such other metal oxides, including aluminum oxide, independently in individual amounts, or otherwise in combined amounts in the case of two or more of such other metal oxides, representing a major portion, such as greater than about 50 wt-%, greater than about 70 wt-%, or greater than about 90 wt-%, of the solid support. In such cases, the solid support may also optionally comprise cerium oxide in an amount representing a minor portion, such as less than about 50 wt-%, less than about 30 wt-%, or less than about 10 wt-%, of the solid support. Such minor portion of cerium oxide may also represent all or substantially all of the balance of the solid support, which is not represented by the one or more of such other metal oxides.

According to particular embodiments, the solid support may comprise, in addition to cerium oxide, a second metal oxide that acts as a binder for cerium oxide. Such second metal oxide may be selected from the group of other metal oxides described above, namely, aluminum oxide, silicon oxide, titanium oxide, zirconium oxide, magnesium oxide, calcium oxide, iron oxide, vanadium oxide, chromium oxide, nickel oxide, tungsten oxide, and strontium oxide. Such second metal oxide may be present in an amount generally from about 1 wt-% to about 45 wt-%, typically from about 5 wt-% to about 35 wt-%, and often from about 10 wt-% to about 25 wt-%, of the solid support. Preferably, the solid support comprises cerium oxide and the second metal oxide in a combined amount of generally at least about 85 wt-%, typically at least about 95 wt-%, and often at least about 99 wt-%, of the solid support. The solid support may comprise cerium oxide and the second metal oxide in a combined amount of generally at least about 85 wt-%, typically at least about 92 wt-%, and often at least about 95 wt-%, of the reforming catalyst. A preferred second metal oxide that acts as a binder for cerium oxide is aluminum oxide.

A preferred property of the solid support (e.g., comprising predominantly cerium oxide), and consequently the reforming catalyst, is low acidity. In this regard, excessive acid sites on the support or catalyst, and in particular strong, Brønsted acid sites, are believed to contribute to coking and catalyst deactivation during the dry reforming and/or steam reforming reactions. Importantly, advantages of a low Brønsted acid site proportion, or concentration, in terms of establishing a commercially feasible catalyst life, are gained despite the fact that strong acid sites are known to promote the activity of a number of significant commercial reactions. An extensively used method for acid site strength determination and quantification with respect to solid materials is temperature programmed desorption using ammonia as a molecular probe ($NH_3$-TPD). According to this method, a sample of the solid material is prepared by degassing and activation at elevated temperature and in an inert environment, in order to remove water and other bound species. The sample is then saturated with $NH_3$, with the saturation temperature (e.g., 100° C.) and subsequent purge with an inert gas (e.g., helium) providing conditions that remove any physisorbed $NH_3$. Temperature programmed desorption of the activated and saturated sample is initiated by ramping the temperature at a predetermined rate (e.g., 10° C./minute) to a final temperature (e.g., 400° C.) under the flow of the inert gas. The concentration of $NH_3$ in this gas is continually measured as it is driven from acid sites of the solid material having increasing strengths that correspond to increasing desorption temperatures. The determination of $NH_3$ concentration in the flowing inert gas can be performed, for example, using gas chromatography with a thermal conductivity detector (GC-TCD).

Typically, the $NH_3$ concentration versus temperature profile will include peaks at low and high temperatures that correspond to sites of the solid material having comparatively low and high acid strengths, respectively. The areas under these peaks can then provide relative concentrations of acids sites of the differing types of acid strength (e.g., expressed as a percentage of total acid sites), or otherwise these areas can be used to determine the absolute concentrations of the differing types (e.g., expressed in terms of milliequivalents per gram of the solid material). In the case of a solid support or reforming catalyst that generates two peaks on the $NH_3$ concentration versus temperature profile over a relevant range, for example from 100° C. to 400° C., a first, low temperature peak may be associated with weak Lewis acid sites, whereas a second, high temperature peak may be associated with strong, Brønsted acid sites. For representative solid supports (e.g., comprising predominantly cerium oxide) as well as reforming catalysts having such supports (in view of the relatively small or negligible impact, on the $NH_3$-TPD analysis, of catalytically active metals being deposited on such supports), the $NH_3$ concentration versus temperature profile obtained from an $NH_3$-TPD analysis over a temperature range from 100° C. to 400° C. (with such profile having, for example, two identifiable peaks) may exhibit a maximum $NH_3$ concentration at a temperature of less than about 300° C. (e.g., from about 150° C. to about 300° C.), and more typically at a temperature of less than about 250° C. (e.g., from about 150° C. to about 250° C.). This maximum $NH_3$ concentration may therefore be associated with a low temperature peak corresponding to weak Lewis acid sites, with the maximum $NH_3$ concentration and temperature at which this concentration is exhibited defining a point on this low temperature peak. Based on a peak area of this low temperature peak, relative to a peak area of a higher temperature peak corresponding to strong, Brønsted acid sites, the Lewis acid sites may represent at least about 25%, at least about 30%, or at least about 35%, of the total acid sites (e.g., the total Lewis and Brønsted acid sites combined). The higher temperature peak may, for example, exhibit a maximum $NH_3$ concentration at a temperature from about 300° C. to about 350° C., or, more typically, from about 300° C. to about 325° C. The maximum $NH_3$ concentration associated with the low temperature peak is normally greater than the maximum $NH_3$ concentration associated with the higher temperature peak, as a further indication that weak Lewis acid sites contribute to a substantial proportion of the overall acid sites of the solid support or reforming catalyst. In representative embodiments, the solid support or reforming catalyst may have a Lewis acid site concentration of at least about 0.25 milliequivalents per gram (meq/g) (e.g., from about 0.25 meq/g to about 1.5 meq/g), and more typically at least about 0.35 milliequivalents per gram (meq/g) (e.g., from about 0.35 meq/g to about 0.85 meq/g).

The solid support (e.g., comprising predominantly cerium oxide), as well as the reforming catalyst comprising such support, may have a surface area from about 1 $m^2/g$ to about 100 $m^2/g$, such as from about 10 $m^2/g$ to about 50 $m^2/g$. Surface area may be determined according to the BET (Brunauer, Emmett and Teller) method based on nitrogen adsorption (ASTM D1993-03(2008)). The support and/or catalyst may have a total pore volume, of pores in a size range of 1.7-300 nanometers (nm), from about 0.01 cc/g to about 0.5 cc/g, such as from about 0.08 cc/g to about 0.25 cc/g. Pore volume may be measured by mercury porosimetry. The support and/or catalyst may have an average pore diameter from about 2 to about 75 nm, such as from about 5 to about 50 nm. The support and/or catalyst may have (i) from about 10% to about 80%, such as from about 30% to about 55%, of its pore volume attributed to macropores of >50 nm, (ii) from about 20% to about 85%, such as from about 35% to about 60%, of its pore volume attributed to mesopores of 2-50 nm, and/or (iii) less than about 2%, such as less than about 0.5%, of its pore volume attributed to micropores of <2 nm. Pore size distribution may be obtained using the Barrett, Joyner, and Halenda method.

Noble metals are understood as referring to a class of metallic elements that are resistant to oxidation. In representative embodiments, the noble metal, for example at least two noble metals, of the catalyst may be selected from the group consisting of platinum (Pt), rhodium (Rh), ruthenium (Ru), palladium (Pd), silver (Ag), osmium (Os), iridium (Ir), and gold (Au), with the term "consisting of" being used merely to denote group members, according to a specific embodiment, from which the noble metal(s) are selected, but not to preclude the addition of other noble metals and/or other metals generally. Accordingly, a catalyst comprising a noble metal embraces a catalyst comprising at least two noble metals, as well as a catalyst comprising at least three noble metals, and likewise a catalyst comprising two noble metals and a third, non-noble metal such as a promoter metal (e.g., a transition metal). According to preferred embodiments, the noble metal is present in an amount, or alternatively the at least two noble metals are each independently present in amounts, from about 0.05 wt-% to about 5 wt-%, from about 0.3 wt-% to about 3 wt-%, or from about 0.5 wt-% to about 2 wt-%, based on the weight of the catalyst. For example, a representative catalyst may comprise the two noble metals Pt and Rh, and the Pt and Rh may independently be present in an amount within any of these ranges (e.g., from about 0.05 wt-% to about 5 wt-%). That is, either the Pt may be present in such an amount, the Rh may be present in such an amount, or both Pt and Rh may be present in such amounts. A particularly preferred, noble metal-containing reforming catalyst comprises both Pt and Rh, each independently present in an amount from about 0.5 wt-% to about 2 wt-%, on a support comprising, comprising substantially all, or consisting essentially of, cerium oxide and optionally a metal oxide binder (e.g., aluminum oxide) as described above. Regardless of the noble metal(s) used or the particular amounts used, preferably these noble metals are in their elemental (metallic or zero oxidation state) form. For example, with respect to the particularly preferred, noble metal-containing reforming catalyst described above, such catalyst may comprise both Pt and Rh, each independently present in their respective elemental forms in an amount from about 0.5 wt-% to about 2 wt-%, based on the weight of the catalyst. Whereas other (compound) forms of Pt and/or Rh may also be present, preferably Pt and/or Rh in non-elemental forms, or noble metals generally in non-elemental forms, are present independently in individual amounts, or otherwise in combined amounts in the case of two or more noble metals, of less than about 1 wt-%, less than about 0.5 wt-%, or even less than about 0.1 wt-%, of the reforming catalyst.

In representative embodiments, the at least two noble metals (e.g., Pt and Rh) may be substantially the only noble metals present in the catalyst, such that, for example, any other noble metal(s) is/are present in an amount or a combined amount of less than about 0.1 wt-%, or less than about 0.05 wt-%, based on the weight of the catalyst. In further representative embodiments, the at least two noble metals (e.g., Pt and Rh) are substantially the only metals present in the catalyst, with the exception of metals present in the solid support (e.g., such as cerium being present in the solid support as cerium oxide). For example, any other metal(s), besides at least two noble metals and metals of the solid support, may be present in an amount or a combined amount of less than about 0.1 wt-%, or less than about 0.05 wt-%, based on the weight of the catalyst. In some embodiments, certain metals may be substantially absent in the catalyst, whether in elemental form or in compound form (e.g., in the form of an oxide as a metal oxide component of the solid support). For example, certain metals may impart unwanted acidity in the solid support, provide insubstantial catalytic activity, and/or catalyze undesired reactions. In particular embodiments, one or more of Si, Ti, Zr, Mg, Ca, Fe, V, Cr, Ni, W, and Sr is substantially absent in the solid support. For example, these metals may be present, independently in individual amounts, or otherwise in combined amounts in the case of two or more of such metals, of less than about 0.5 wt-%, less than about 0.1 wt-%, or even less than about 0.05 wt-%, of the reforming catalyst, or of the solid support for the catalyst. For example, one or more of Si, Zr, Mg, and Ni may be present in these individual amounts or combined amounts. Any metals present in the catalyst, including noble metal(s), may have a metal particle size in the range generally from about 0.3 nanometers (nm) to about 20 nm, typically from about 0.5 nm to about 10 nm, and often from about 1 nm to about 5 nm.

The noble metal(s) may be incorporated in the solid support according to known techniques for catalyst preparation, including sublimation, impregnation, or dry mixing. In the case of impregnation, which is a preferred technique, an impregnation solution of a soluble compound of one or more of the noble metals in a polar (aqueous) or non-polar (e.g., organic) solvent may be contacted with the solid support, preferably under an inert atmosphere. For example, this contacting may be carried out, preferably with stirring, in a surrounding atmosphere of nitrogen, argon, and/or helium, or otherwise in a non-inert atmosphere, such as air. The solvent may then be evaporated from the solid support, for example using heating, flowing gas, and/or vacuum conditions, leaving the dried, noble metal-impregnated support. The noble metal(s) may be impregnated in the solid support, such as in the case of two noble metals being impregnated simultaneously with both being dissolved in the same impregnation solution, or otherwise being impregnated separately using different impregnation solutions and contacting steps. In any event, the noble metal-impregnated support may be subjected to further preparation steps, such as washing with the solvent to remove excess noble metal(s) and impurities, further drying, calcination, etc. to provide the catalyst.

The solid support itself may be prepared according to known methods, such as extrusion to form cylindrical particles (extrudates) or oil dropping or spray drying to form spherical particles. Regardless of the specific shape of the solid support and resulting catalyst particles, the amounts of noble metal(s) being present in the catalyst, as described above, refer to the weight of such noble metal(s), on average, in a given catalyst particle (e.g., of any shape such as cylindrical or spherical), independent of the particular distribution of the noble metals within the particle. In this regard, it can be appreciated that different preparation methods can provide different distributions, such as deposition of the noble metal(s) primarily on or near the surface of the solid support or uniform distribution of the noble metal(s) throughout the solid support. In general, weight percentages described herein, being based on the weight of the solid support or otherwise based on the weight of catalyst, can refer to weight percentages in a single catalyst particle but more typically refer to average weight percentages over a large number of catalyst particles, such as the number in a reactor that form a catalyst bed as used in processes described herein.

General Reforming Process Description, Including Conditions

In representative embodiments, a reformer feed or combined feed as described herein may be contacted with reforming catalyst in a batchwise or discontinuous operation, but preferably the reforming process for producing hydrogen is performed continuously with flowing streams of the reformer feed and/or combined feed (e.g., following mixing with a steam-containing feed), to improve process efficiency. For example, contacting may be performed by continuously flowing the combined feed through a reforming reactor that contains a noble metal-containing reforming catalyst as described herein and that maintains reforming conditions (e.g., conditions within a reactor vessel and within a bed of the catalyst that is contained in the vessel), including a temperature, pressure, and flow rate for the effective conversion of methane, and optionally other hydrocarbons, to hydrogen.

Reforming conditions that are useful for this purpose include a temperature generally from about 649° C. (1200° F.) to about 871° C. (1600° F.). In preferred embodiments, processes described herein, by virtue of the high activity of the reforming catalyst, can effectively oxidize methane and/or other hydrocarbons at significantly lower temperatures, compared to a representative conventional reforming temperature of 816° C. (1500° F.). For example, in representative embodiments, the reforming conditions can include a temperature in a range from about 677° C. (1250° F.) to about 788° C. (1450° F.), or from about 704° C. (1300° F.) to about 760° C. (1400° F.). In the case of dry reforming, for example if the oxidant for reforming is predominantly, substantially all, or all $CO_2$ as described above, higher temperatures may be used, for example from about 843° C. (1550° F.) to about 1010° C. (1850° F.), or from about 885° C. (1625° F.) to about 941° C. (1725° F.). The presence of $H_2S$ and/or other sulfur-bearing contaminants in significant concentrations (e.g., 100-1000 mol-ppm) may warrant increased temperatures, for example in a range from about 732° C. (1350° F.) to about 843° C. (1550° F.), or from about 760° C. (1400° F.) to about 816° C. (1500° F.), to maintain desired conversion levels of methane and optionally other hydrocarbons (e.g., a methane conversion, or a hydrocarbon conversion, of greater than about 85%). Yet other reforming conditions can include an above-ambient pressure, i.e., a pressure above a gauge pressure of 0 kPa (0 psig), corresponding to an absolute pressure of 101 kPa (14.7 psia). Because the reforming reactions make a greater number of moles of product versus moles of reactant, equilibrium is favored at relatively low pressures. Therefore, reforming conditions can include a gauge pressure generally from about 0 kPa (0 psig) to about 517 kPa (75 psig), typically from about 0 kPa (0 psig) to about 345 kPa (50 psig), and often from about 103 kPa (15 psig) to about 207 kPa (50 psig). According to some embodiments, it may be desirable to operate at higher pressures, for example in the range from about 207 kPa (30 psig) to about 5.2 MPa (750 psig), such as from about 1.4 MPa (200 psig) to about 3.4 MPa (500 psig). For example, $H_2$ removal using an $H_2$ separator upstream of the reforming reactor may involve a high pressure operation such as membrane separation. In this case, the high pressure may be maintained in the reformer feed or combined feed, in order to reduce or minimize compressor costs, despite a somewhat negative impact of the high pressure on equilibrium conversion that can be achieved in the reforming reaction. This equilibrium conversion deficit may be offset by adjusting other reforming conditions, such as increasing the reforming temperature, increasing the steam/carbon molar ratio, and/or increasing weight hourly space velocity (WHSV).

The reforming conditions may further include a WHSV generally from about 0.05 $hr^{-1}$ to about 10 $hr^{-1}$, typically from about 0.1 $hr^{-1}$ to about 8.0 $hr^{-1}$, and often from about 0.5 $hr^{-1}$ to about 5.0 $hr^{-1}$. As is understood in the art, the WHSV is the weight flow of the reformer feed or combined feed (in the case of two or more streams being combined, prior to their introduction to the reforming reactor) divided by the weight of the catalyst in the reforming reactor and represents the equivalent catalyst bed weights of the feed stream processed every hour. The WHSV is related to the inverse of the reactor residence time. The reforming catalyst may be contained within the reforming reactor in the form of a fixed bed, but other catalyst systems are also possible, such as moving bed and fluidized bed systems that may be beneficial in processes using continuous catalyst regeneration. Regardless of the particular bed configuration, preferably the catalyst bed comprises discreet catalyst particles, as opposed to a monolithic form of catalyst. For example, such discreet catalyst particles may have a spherical or cylindrical diameter of less than about 10 mm and often less than about 5 mm (e.g., about 2 mm), in the case of cylindrical catalyst particles (e.g., formed by extrusion), these may have a comparable length dimension (e.g., from about 1 mm to about 10 mm, such as about 5 mm). Yet further reforming conditions include a steam/carbon molar ratio of the reformer feed or combined feed, preferably within ranges as described above.

Advantageously, within any of the above temperature ranges, the high activity of the catalyst can achieve a conversion of methane and optionally other hydrocarbon(s) (e.g., a conversion of methane, a conversion of methane and ethane combined, a conversion of $C_1$-$C_3$ hydrocarbons combined, or a conversion of $C_1$-$C_4$ hydrocarbons combined) of at least about 80% (e.g., from about 80% to about 99%), at least about 85% (e.g., from about 85% to about 99%), or at least about 90% (e.g., from about 90% to about 97%), for example by adjusting the particular reactor or catalyst bed temperature and/or other reforming conditions (e.g., WHSV and/or pressure) as would be appreciated by those having skill in the art, with knowledge gained from the present disclosure. Advantageously, noble metal-containing catalysts as described herein may be sufficiently active to achieve a significant hydrocarbon (e.g., methane) conversion, such as at least about 85%, in a stable manner at a temperature of at most about 732° C. (1350° F.), or even at most about 704° C. (1300° F.). In the case of dry reforming, for example if the oxidant for reforming is predominantly, substantially all, or all $CO_2$ as described above, such hydrocarbon (e.g., methane) conversion levels may be achieved at higher temperatures, for example at most about 918° C. (1685° F.), or even at most about to about 885° C. (1625° F.). With respect to oxidants, a representative conversion of $H_2O$ and/or $CO_2$ is at least about 50% (e.g., from about 50% to about 98%, such as from about 75% to about 95%), at the conversion levels described herein with respect to hydrocarbon(s). Conversion levels of hydrocarbons such as methane and/or oxidants such as $H_2O$ and/or $CO_2$ may be achieved in processes in which the oxidant is (i) predominantly, substantially all, or all $H_2O$, (ii) a combination of $H_2O$ and $CO_2$, or (iii) predominantly, substantially all, or all $CO_2$. As is understood in the art, conversion of any particular compound (e.g., methane) or combination of compounds (e.g., $C_1$-$C_3$ hydrocarbons or $C_1$-$C_4$ hydrocarbons) can be calculated on the basis of:

$$100*(X_{feed}-X_{prod})/X_{feed},$$

wherein $X_{feed}$ is the total amount (e.g., total weight or total moles) of the compound(s) X in the reformer feed or combined feed (in the case of two or more streams being combined, prior to their introduction to the reforming reactor) provided to the reforming reactor and $X_{prod}$ is the total amount of the compound(s) X in the reformer product or effluent removed from the reactor. In the case of continuous processes, these total amounts may be more conveniently expressed in terms of flow rates, or total amounts per unit time (e.g., total weight/hr or total moles/hr). In other representative embodiments, in the case of reformer feeds or combined feeds comprising methane, together with (i) one or more $C_2$ paraffinic hydrocarbons and/or (ii) one or more $C_2$ olefinic hydrocarbons, the methane, (i) and/or (ii) are reformed with a hydrocarbon conversion in any of the ranges given above, such as at least about 85% (e.g., from about 85% to about 99%).

Other performance criteria that can be achieved using catalysts and reforming conditions as described herein include a high hydrogen yield, or portion of the total hydrogen in the methane and optionally other hydrocarbon(s) (e.g., total hydrogen in methane, $C_1$-$C_3$ hydrocarbons, or $C_1$-$C_4$ hydrocarbons), in the reformer feed or combined feed (in the case of two or more streams being combined, prior to their introduction to the reforming reactor) provided to the reforming reactor, which is converted to hydrogen in the reformer product removed from the reactor. In representative embodiments, the hydrogen yield is at least about 70% (e.g., from about 70% to about 98%), such as at least about 80% (e.g., from about 80% to about 95%). As described above with respect to conversion, amounts provided to and removed from the reactor may be expressed in terms of flow rates. Furthermore, in view of the reforming reactions, given above, producing both $H_2$ and CO, the concentration of both of these components will generally be increased in the reformer product, relative to the reformer feed or combined feed (in the case of two or more streams being combined, prior to their introduction to the reforming reactor). Also, as a result of some water-gas shift (WGS) reaction occurring in situ in the reforming reactor, the $CO_2$ concentration may be increased in the reformer product, relative to the reformer feed. In this regard, noble metal-containing reforming catalysts as described herein may have the ability to catalyze the WGS reaction under the reforming conditions. In representative embodiments, the reformer product comprises $H_2$ in a concentration of at least about 30 mol-% (e.g., from about 30 mol-% to about 90 mol-%) or at least about 40 mol-% (e.g., from about 40 mol-% to about 80 mol-%). In further representative embodiments, the reformer product comprises CO in a concentration of at least about 5 mol-% (e.g., from about 5 mol-% to about 50 mol-%) or at least about 8 mol-% (e.g., from about 8 mol-% to about 25 mol-%). In other embodiments, according to which high levels of conversion of hydrocarbons (e.g., methane) are achieved via steam reforming and/or dry reforming, the reformer product may comprise CO in a higher concentration, such as at least about 30 mol-% (e.g., from about 30 mol-% to about 65 mol-%) or at least about 40 mol-% (e.g., from about 40 mol-% to about 55 mol-%). In addition, if hydrogen is present in the reformer feed or combined feed, the $H_2$/CO molar ratio of the reformer product may be above the stoichiometric ratios implicated by the reforming reactions given above, i.e., 3:1 in the case of reforming methane with $H_2O$ and 1:1 in the case of reforming methane with $CO_2$. Considering the amount of hydrogen (if any) present in the reformer feed, the relative amounts of the oxidants $H_2O$ and $CO_2$ present in this feed may be varied to achieve a desired $H_1$-2/CO molar ratio of the reformer product. In representative embodiments, the $H_2$/CO molar ratio of the reformer product may be from about 1.0 to about 7.0, such as from about 4.0 to about 6.5, in the case of hydrogen production. Otherwise, in the case of synthesis gas production, the $H_2$/CO molar ratio may be from about 1.0 to about 3.0, such as from about 1.8 to about 2.4. According to yet other embodiments, for example in the case of reforming methane and/or other hydrocarbons with an oxidant that may be predominantly, substantially all, or all $CO_2$, the $H_2$/CO molar ratio of the reformer product may be less in view of the stoichiometry of the dry reforming reaction. For example, this $H_2$/CO molar ratio may be from about 0.5 to about 1.5, such as from about 0.8 to about 1.2.

The reformer product exiting the reforming reactor may be subjected to downstream processing steps to increase its hydrogen content and then separate and recover a hydrogen-enriched product. For example, representative hydrogen production processes, in addition to a reforming step as described herein, may further comprise converting at least a portion of the CO in the reformer product to additional $H_2$ by a water-gas shift (WGS) reaction to provide a WGS product having an increased $H_2$ concentration, relative to the reformer product. Conventionally, two WGS reaction stages have been used, namely a high temperature shift (HTS) and a low temperature shift (LTS). The HTS reaction typically operates at a temperature lower than that used for reforming (e.g., about 350° C. (662° F.)), in order to shift the equilibrium of the WGS reaction toward the production of additional $H_2$. A typical catalyst for this reaction comprises both Fe and Cr, supported on copper oxide, which can be effective for reducing CO concentration in the reformer product to about 3 mol-%. The LTS reaction, operating at a temperature lower than that used for the HTS reaction (e.g., about 200° C. (392° F.)) can provide yet further $H_2$ in view of a further shift of the equilibrium at this lower temperature. A typical catalyst for this reaction comprises both Cu and Zn, supported on alumina. The combination of the HTS reaction and downstream LTS reaction can then further reduce the CO concentration remaining in the reformer product to about 0.3 mol-%.

However, as an alternative to using multiple WGS stages, aspects of the invention are associated with the discovery that the noble metal-containing reforming catalysts described herein are highly active for performing the WGS reaction on the reformer product. Accordingly, any of these reforming catalysts may alternatively be termed "WGS catalysts," when used under WGS conditions, including the temperatures for this step, as described herein. For example, as in the case of exemplary catalysts for use in the reforming reactor, exemplary catalysts for use in a WGS reactor, downstream of the reforming reactor, are noble metal-containing catalysts comprising both Pt and Rh, each independently present in an amount from about 0.5 wt-% to about 2 wt-%, on a support comprising, comprising substantially all, or consisting essentially of, cerium oxide and optionally a metal oxide binder (e.g., aluminum oxide) as described above. Advantageously, according to particular embodiments, such catalysts may be used in a single stage of WGS reaction (i.e., a single downstream WGS reactor), to provide a WGS product having both an increased $H_2$ concentration and a decreased CO concentration, relative to the reformer product. In view of the high activity of WGS catalysts described herein, they are effective for attaining significant levels of CO conversion according to the WGS reaction:

$$CO + H_2O \rightarrow CO_2 + H_2,$$

even at moderate (intermediate) inlet temperatures of the downstream WGS reactor. For example, representative inlet temperatures, in conjunction with the use of a noble metal-containing WGS catalyst as described herein, are from about 200° C. (392° F.) to about 350° C. (662° F.), or from about 250° C. (482° F.) to about 300° C. (572° F.). To obtain such inlet temperatures of the downstream WGS reactor, the reformer product, exiting the reforming reactor at significantly higher temperatures, may be cooled using a reformer product cooler, prior to performing the WGS reaction. The downstream WGS reactor at these moderate inlet temperatures, and generally higher outlet temperatures due to the exothermic nature of the WGS reaction, can be used to obtain a WGS product having an acceptably low concentration of CO, for example less than about 3 mol-% (e.g., from about 0.1 mol-% to about 3 mol-%) or less than about 1 mol-% (e.g., from about 0.1 mol-% to about 1 mol-%).

Optionally, two or more stages of WGS reaction (e.g., using two or more separate WGS reactors with intermediate cooling) may be used, and each of these may include the use of a noble metal-containing WGS catalyst as described herein. Alternatively, in the case of two or more stages, at least one of such stages may include the use of a supported Fe/Cr catalyst, a supported Cu/Zn catalyst, or other non-noble metal-containing, solid supported catalyst. For example, one stage of WGS reaction may be performed with a noble metal-containing WGS catalyst as described herein, and a second stage may be performed with such other catalyst. In general, processes may comprise cooling the reformer product and then performing one or more stages of WGS reaction, with optional cooling between stages, to provide the WGS product as described herein.

Following the WGS reaction downstream of the reforming reaction (e.g., performed in a single WGS reaction stage using a WGS catalyst as described herein, or performed in multiple WGS stages), additional steps may be performed to recover hydrogen. For example, representative processes may further comprise (i) condensing water from the WGS product, providing a water-depleted WGS product as described herein, followed by (ii) separating hydrogen from this water-depleted WGS product (e.g., by pressure swing adsorption (PSA) or membrane separation), to provide the hydrogen-enriched product, as well as a hydrogen-depleted product. The hydrogen-depleted product, being enriched in non-hydrogen components of the reformer product, WGS product, and/or water-depleted WGS product, which non-hydrogen components are typically CO, $CO_2$, and/or unreacted methane, may be referred to a tail gas. Depending on the type of separation used to provide the hydrogen-enriched product, this tail gas may be termed a PSA tail gas or a membrane tail gas. The tail gas generally also contains a minor amount, as described herein, of hydrogen that is unrecovered in the hydrogen-enriched product. With respect to this product, there is generally an inverse relationship between the amount of recovered hydrogen and its hydrogen purity.

The hydrogen-enriched product may then be used in a conventional refinery process such as a hydrotreating process (e.g., hydrodesulfurization, hydrocracking, hydroisomerization, etc.). The hydrogen-depleted product (e.g., PSA tail gas) may be further separated to recover hydrogen and/or used as combustion fuel to satisfy at least some of the heating requirements of the reforming, which generally operates using the elevated temperatures as described herein. In yet further embodiments, the CO- and $H_2$-containing tail gas (e.g., PSA tail gas) may be passed to a biological fermentation stage for the production of fermentation products such as alcohols (e.g., ethanol). The gaseous effluent from the fermentation stage may then be separated to recover hydrogen and/or used as combustion fuel as described above. Alternatively, in view of the presence of methane in the tail gas or gaseous effluent (e.g., due to breakthrough from the reforming reactor), together with components such as CO and $CO_2$ that are well tolerated by reforming catalysts described herein, these gases may be recycled back to the reforming reactor for the production of additional hydrogen, using recycled methane and/or recycled $CO_2$ as reactants. For example, the hydrogen-depleted product (e.g., PSA tail gas) may be used as a supplemental reformer feed, such as by being combined with (i) the reformer feed or combined feed as described herein, (ii) a process stream as described herein, for obtaining the reformer feed as described herein, or with another process stream (e.g., a sweetened process stream, following sulfur removal, or a steam-containing feed) upstream of the reforming reactor.

With respect to conventional hydrogen production, the further integration of a biological fermentation stage is described, for example, in U.S. Pat. Nos. 9,605,286; 9,145,300; US 2013/0210096; and US 2014/0028598. As an alternative to integration in a hydrogen production process, the reforming as described herein may be used to provide a synthesis gas product that is used directly in the downstream production of fermentation products (e.g., ethanol or higher alcohols) using suitable carboxydotrophic bacteria (e.g., of the species *Clostridium autoethanogenum* or *Clostridium ljungdahlii*). In either case, i.e., with or without such integration, the microorganisms used for the fermentation may be sulfur tolerant or even require sulfur in the cell culture medium, such that the sulfur tolerance of catalysts as described herein can be particularly advantageous over conventional reforming catalysts, in terms of compatibility and cost savings associated with the elimination of, or at the least reduced requirements for, upstream sulfur removal.

Exemplary Process Streams, for Obtaining Reformer Feeds and Combined Feeds

Reformer feeds and combined feeds described herein may be obtained from a number of methane-containing process streams, some of which may be available in relatively small quantities, such that reforming of such process streams in isolation using conventional pretreating steps would be uneconomical. Reformer feeds and combined feeds, such as those having component concentrations and/or other compositional characteristics as described herein, may comprise all or substantially all, or at least a portion, of one or more of such process streams. In representative embodiments, reformer feeds and combined feeds comprise one or more of such process streams, following one or more pretreatment steps. According to particular embodiments, such pretreatment steps may advantageously be limited to sweetening (i.e., sulfur removal) and/or hydrogen separation. Alternatively, or in combination, such pretreatment steps may advantageously exclude conventional upgrading steps such as (i) hydrotreating to convert $C_2$ olefinic hydrocarbons to their corresponding paraffinic hydrocarbons, (ii) a WGS reaction to convert CO to $CO_2$, (iii) $CO_2$ removal (e.g., by amine scrubbing), and/or (iv) pre-reforming to convert $C_2$ paraffinic hydrocarbons to $H_2$.

One important process stream is natural gas, and particularly stranded natural gas, which, as described above, is not easily reformed using conventional catalyst systems, without significant pretreating steps that may be cost-prohibitive on a relatively small scale. Natural gas comprising a relatively high concentration of $CO_2$, for example at least about 10 mol-% or even at least about 25 mol-%, represents an exemplary process stream, since processes as described herein do not require the removal of $CO_2$, and these processes may in fact utilize $CO_2$, at least partially, as an oxidant for methane. Other methane-containing process streams may comprise, or be derived from, a coal or biomass (e.g., lignocellulose or char) gasification effluent, from a biomass digester effluent, or an effluent of a renewable hydrocarbon fuel (biofuel) production process (e.g., a pyrolysis process, such as a hydropyrolysis processes, or a fatty acid/triglyceride hydroconversion processes). Further methane-containing process streams may comprise, or be derived from, a well head effluent or from an effluent of an industrial process including (i) a petroleum refining process, such as a refinery off gas or fuel gas, (ii) an electric power production process, (iii) a steel manufacturing process or a non-ferrous manufacturing process, (iv) a chemical (e.g., methanol) production process, or (v) a coke manufacturing process.

Generally, any process stream (including those as described herein) containing methane, optionally other hydrocarbons (e.g., ethane and/or propane), and/or optionally CO and/or $CO_2$, may provide all, substantially all, or at least a portion, of the reformer feed or combined feed as described herein. In the case of a reformer feed, this may optionally be combined with an $H_2O$-containing oxidant (e.g., a steam-containing feed) to provide a combined feed.

Exemplary process streams include a hydropyrolysis gaseous mixture recovered from biomass hydropyrolysis, such as those having (i) a methane concentration of generally about 2 mol-% to about 45 mol-% (e.g., about 2 mol-% to about 25 mol-% or about 5 mol-% to about 12 mol-%), (ii) ethane and propane concentrations each of generally about 1 mol-% to about 35 mol-% (e.g., about 1 mol-% to about 25 mol-% each or about 2 mol-% to about 15 mol-% each), and/or (iii) a $CO_2$ concentration of generally about 1 mol-% to about 75 mol-% (e.g., about 1 mol-% to about 55 mol-% or about 1 mol-% to about 10 mol-%). Other process streams include a hydropyrolysis gaseous mixture recovered from biomass hydropyrolysis, having (i) a methane concentration of generally about 3 mol-% to about 45 mol-% (e.g., about 5 mol-% to about 25 mol-% or about 7 mol-% to about 20 mol-%), (ii) ethane and propane concentrations each of generally about 1 mol-% to about 35 mol-% (e.g., about 2 mol-% to about 25 mol-% each or about 8 mol-% to about 20 mol-% each), (iii) a total CO and $CO_2$ concentration of generally about 10 mol-% to about 75 mol-% (e.g., about 15 mol-% to about 70 mol-% or about 25 mol-% to about 60 mol-%), (iv) an $H_2$ concentration of generally about 1 mol-% to about 30 mol-% (e.g., about 3 mol-% to about 25 mol-% or about 5 mol-% to about 15 mol-%), and/or (v) a $C_4^+$ hydrocarbon concentration of greater than about 0.5 mol-% (e.g., about 0.5 mol-% to about 3 mol-%). The balance of any such hydropyrolysis gaseous mixture may be substantially water vapor. However, depending on the actual amount of water vapor, an $H_2O$-containing oxidant (e.g., a steam-containing feed) may optionally be combined with the hydropyrolysis gaseous mixture to provide a combined feed as described herein. In this case, the $H_2O$-containing oxidant may be readily available as a condensed aqueous phase that is separated from a substantially fully deoxygenated hydrocarbon liquid generated from the hydropyrolysis of biomass (e.g., a hydrocarbon-containing liquid having a total oxygen content of less than about 2% by weight, or less than about 1% by weight). As a further option, all or a portion of the hydrogen of such hydropyrolysis gaseous mixture may be separated in an upstream hydrogen separation step, to provide all or a portion of the reformer feed, or all or a portion of the combined feed, for example in each case having a reduced $H_2$ concentration, relative to the hydropyrolysis gaseous mixture.

Exemplary process streams further include natural gas comprising $CO_2$ in a concentration of generally about 3 mol-% to about 35 mol-% (e.g., about 5 mol-% to about 30 mol-% or about 10 mol-% to about 25 mol-%) and methane in a concentration of generally about 65 mol-% to about 98 mol-% (e.g., about 70 mol-% to about 95 mol-% or about 75 mol-% to about 90 mol-%). Other hydrocarbons (e.g., ethane and propane), as well as nitrogen, may be present in minor concentrations. Exemplary process streams further include biogas obtained from the bacterial digestion of organic waste, such as from anaerobic digestion processes and from landfills. Biogas contains methane in a concentration of generally about 35 mol-% to about 90 mol-% (e.g., about 40 mol-% to about 80 mol-% or about 50 mol-% to about 75 mol-%) and $CO_2$ in a concentration of generally about 10 mol-% to about 60 mol-% (e.g., about 15 mol-% to about 55 mol-% or about 25 mol-% to about 50 mol-%). The gases $N_2$, $H_2$, $H_2S$, and 02 may be present in minor concentrations (e.g., in a total concentration of less than 20 mol-%, or less than 10 mol-%).

Exemplary process streams further include refinery fuel gas streams that are normally combusted to provide heat, as opposed to being used for the production of hydrogen as a higher value end product, in view of the poorer economics of conventional hydrogen production processes. A refinery fuel gas stream may have (i) a paraffinic hydrocarbon concentration (e.g., a total methane and ethane concentration) of generally about 5 mol-% to about 50 mol-% (e.g., about 5 mol-% to about 25 mol-% or about 7 mol-% to about 20 mol-%), (ii) an olefinic hydrocarbon concentration (e.g., a total ethylene and propylene concentration) of generally about 1 mol-% to about 35 mol-% (e.g., about 1 mol-% to about 25 mol-% or about 1 mol-% to about 5 mol-%), (iii) a total CO and $CO_2$ concentration of generally about 1 mol-% to about 35 mol-% (e.g., about 1 mol-% to about 20 mol-% or about 1 mol-% to about 15 mol-%), and/or a (iv) an $H_2$ concentration of generally about 1 mol-% to about 30 mol-% (e.g., about 3 mol-% to about 25 mol-% or about 5 mol-% to about 15 mol-%). The balance of any such refinery fuel gas stream may be substantially water vapor. However, depending on the actual amount of water vapor, an $H_2O$-containing oxidant (e.g., a steam-containing feed) may optionally be combined with the refinery fuel gas stream to provide a combined feed as described herein. As a further option, all or a portion of the hydrogen of such refinery fuel gas stream may be separated in an upstream hydrogen separation step, to provide all or a portion of the reformer feed, or all or a portion of the combined feed, for example in either case having a reduced $H_2$ concentration, relative to the refinery fuel gas stream.

Exemplary process streams further include hydrogen-depleted PSA tail gas, for example obtained from a hydrogen production process involving SMR with downstream PSA to recover a hydrogen-enriched product stream, as described herein. That is, the PSA tail gas may be recycled to provide at least a portion of the reformer feed or combined feed as described herein, and thereby produce additional hydrogen from components of this process stream, such as unconverted methane resulting from breakthrough from the reforming reactor. A hydrogen-depleted PSA tail gas may have (i) a methane concentration of generally about 5 mol-% to about 45 mol-% (e.g., about 10 mol-% to about 35 mol-% or about 15 mol-% to about 25 mol-%), (ii) a $CO_2$ concentration of generally about 20 mol-% to about 75 mol-% (e.g., about 25 mol-% to about 70 mol-% or about 35 mol-% to about 60 mol-%), and/or (iii) an $H_2$ concentration of generally about 10 mol-% to about 45 mol-% (e.g., about 15 mol-% to about 40 mol-% or about 20 mol-% to about 35 mol-%). The balance of this stream may be substantially water vapor and/or CO.

Exemplary process streams further include a gaseous effluent from a bacterial fermentation that is integrated with a hydrogen production process, for example in the production of ethanol or a higher alcohol by bacterial fermentation of a PSA tail gas as described herein. In the case of such fermentation effluent, this process stream may have (i) a methane concentration of generally about 5 mol-% to about 55 mol-% (e.g., about 5 mol-% to about 45 mol-% or about 10 mol-% to about 40 mol-%), (ii) a $CO_2$ concentration of generally about 5 mol-% to about 75 mol-% (e.g., about 5 mol-% to about 60 mol-% or about 10 mol-% to about 50 mol-%), and (iii) an $H_2$ concentration of generally about 5 mol-% to about 40 mol-% (e.g., about 5 mol-% to about 30 mol-% or about 10 mol-% to about 25 mol-%). The balance of this stream may be substantially water vapor and/or CO.

If the reformer feed or combined feed comprises methane obtained from a renewable resource (e.g., biomass), for example methane from a process stream obtained by hydropyrolysis as described in U.S. Pat. No. 8,915,981 assigned to Gas Technology Institute, then processes described herein may be used to produce renewable hydrogen that, in turn, can be returned for use in such hydropyrolysis processes for producing renewable hydrocarbon-containing fuels, fuel blending components, and/or chemicals. Renewable hydrogen produced in this manner can alternatively be used in conventional chemical production or refining (e.g., hydroprocessing) processes. Accordingly, the reformer feed and/or combined feed may comprise methane from a non-renewable source (e.g., natural gas) and/or methane from a renewable source (e.g., biomass), with the latter source imparting an overall reduction in the carbon footprint associated with hydrogen production and the downstream production of end products (e.g., chemicals or refined petroleum fractions). Natural gas or other process streams, as described herein, may be pretreated to remove $H_2S$ and other sulfur-bearing contaminants, to provide representative reformer feeds or combined feeds, prior reforming.

Exemplary Hydrogen Production Processes

FIG. 1 depicts a flowscheme, illustrating a process for producing hydrogen by reforming. Advantageously, by virtue of using noble metal-containing catalysts described herein, certain processing steps upstream of reforming reactor 700 may be avoided. This can significantly reduce process complexity and expense, particularly in view of the ability to forego not only the vessels associated with these steps, but also the associated auxiliary equipment and systems, including heat exchangers, separators, pumps, valves, and instrumentation. In particular, the extensive pretreatment of process streams, required in conventional reforming for hydrogen production (e.g., using nickel-based catalysts), is illustrated with the use of hydrotreating reactor 100, sulfur guard bed 200, upstream water-gas shift (WGS) reactor 300, amine scrubber 401, amine regenerator 402, upstream $H_2$ separator 501, and pre-reformer 600, all of which are upstream of reforming reactor 700. In view of the ability of the noble metal-containing catalysts described herein to resist deactivation due to coking from the presence of $C_2^+$ hydrocarbons, including olefinic hydrocarbons, and CO, pretreatment using hydrotreating reactor 100, upstream WGS reactor 300, amine scrubber 401, amine regenerator 402, and pre-reformer 600, may be avoided, thereby resulting in significant capital and operating cost savings, particularly energy cost savings. These elements are therefore illustrated in FIG. 1 using dashed lines. For example, it is estimated that the elimination of these elements can reduce capital costs for a hydrogen production process by 50%.

According to representative processes in which such elements are advantageously avoided, process stream 10, for example, a process stream according to any of the embodiments described herein and comprising methane, together with CO and/or $CO_2$, as well as possibly $C_2$ hydrocarbons, including olefinic hydrocarbons, may avoid conventional hydrotreating reactor 100. Such process stream may comprise methane obtained from a renewable resource, as in the case of a hydropyrolysis gaseous mixture, obtained from biomass hydropyrolysis (or optionally following two stages of hydropyrolysis and hydroconversion), described above. In the event that process stream 10 comprises levels of $H_2S$ or other sulfur-bearing components (e.g., mercaptans) that warrant their reduction or removal upstream of reforming reactor 700, the process may comprise contacting process stream 10 with sulfur guard bed 200, for example comprising an adsorbent having selective affinity for such sulfur-bearing components, such as an adsorbent comprising zinc oxide. This contacting may result in sweetened process stream 12, having a decreased concentration of total sulfur, relative to process stream 10. For example process stream 10 may have a total sulfur concentration of at least about 100 mol-ppm, or at least about 1000 mol-ppm, whereas sweetened process stream 12, as a result of treatment in sulfur guard bed 200, may have a total sulfur concentration of less than 10 mol-ppm, or even less than 1 mol-ppm. Otherwise, in the case of process stream 10 having a sulfur level that is acceptable for reforming reactor 700, there may be no need for a sulfur removal system, such that process stream 10 may be fed directly as the reformer feed to this reactor, or otherwise subjected to different, intervening steps upstream of this reactor, as described herein.

Whereas process stream 10 or sweetened process stream 12 may contain CO and/or $CO_2$, conventional, upstream water-gas shift (WGS) reactor 300 and/or a $CO_2$ removal system may nonetheless be avoided. In the embodiment depicted in FIG. 1, this $CO_2$ removal system, or acid gas removal system generally, is depicted as amine scrubber 401 and amine regenerator 402, together with fresh/regenerated amine solution circulation loop 2. A typical amine solution for such system is an alcohol-substituted amine, such as monoethanolamine, diethanolamine, methyl diethanolamine, or diisopropanolamine. In view of the avoidance of upstream WGS reactor 300 and additional equipment 401/402 for acid gas (e.g., $CO_2$) removal, the process may further comprise separating hydrogen from process stream 10 or sweetened process stream 12, using upstream $H_2$ separator 501, which may be an adsorbent-based system, in the case of pressure swing adsorption (PSA), or otherwise a membrane-based system. As described above, rapid cycle pressure swing adsorption (RCPSA) is a particular adsorbent-based system, which is exemplary for performing such upstream $H_2$ separation. The separation of hydrogen may therefore be performed directly on process stream 10 or sweetened process stream 12, without any intervening operations such as $CO_2$ removal. The separation may provide reformer feed 14, having a decreased $H_2$ concentration, relative to process stream 10 or sweetened process stream 12. The hydrogen in such stream may be concentrated in upstream hydrogen-enriched fraction 3, removed using upstream $H_2$ separator 501.

The process may then further comprise combining reformer feed 14, which in other embodiments may be the same or substantially the same as process stream 10 or sweetened process stream 12, depending on pretreating requirements, with steam-containing feed 16, in the event that reformer feed 14 requires added water vapor for reforming of the hydrocarbons contained in this feed. This combining of reformer feed and steam-containing feed 16 results in combined feed 18. Whereas reformer feed 14 and/or combined feed 18 may contain $C_2^+$ paraffinic hydrocarbons (e.g., ethane and/or propane), the use of a conventional step to eliminate or at least mitigate such hydrocarbons, such as pre-reformer 600, may also be avoided, in view of the tolerance or robustness of noble metal-containing reforming catalysts described herein for $C_2^+$ paraffinic hydrocarbons and other non-methane hydrocarbons. The process may therefore comprise feeding combined feed 18 to reforming reactor 700 containing such reforming catalyst, for example this feed may be introduced directly to this reactor, without any intervening operation, or at least without pre-reforming to convert $C_2$ paraffinic hydrocarbons to $H_2$ and CO. As described herein, in reforming reactor 700, at least a portion of the methane in reformer feed 14, process stream 10, and/or sweetened process stream 12 (depending on upstream pretreatment requirements) is reformed by reaction with at least a portion (e.g., representing a stoichiometric amount) of $H_2O$ in any of these streams, and/or in steam-containing feed 16.

Accordingly, embodiments of the invention are directed to processes for producing hydrogen, comprising a first step of combining reformer feed 14 comprising methane and one or both of CO and $CO_2$ with steam-containing feed 16 to provide combined feed 18. The processes may further comprise a second step of feeding reformer feed 14 to reforming reactor 700 comprising a noble metal-containing reforming catalyst as described herein, to reform at least a portion of the methane by reaction with at least a portion (e.g., representing a stoichiometric amount) of $H_2O$ in steam-containing feed 16. Advantageously, according to more particular embodiments, prior to (or upstream of) the first step, reformer feed 14 has not been subjected to one or more upgrading (pretreating) steps selected from the group consisting of (a) hydrotreating to convert $C_2$ olefinic hydrocarbons (e.g., ethylene) to paraffinic hydrocarbons (e.g., ethane), (b) a WGS reaction to convert CO to $CO_2$, and (c) $CO_2$ removal (e.g., using an amine scrubbing system or other system for acid gas removal generally). Alternatively, or in combination, prior to (or upstream of) the second step, combined feed 18 has not been subjected to pre-reforming to convert $C_2$ paraffinic hydrocarbons to $H_2$ and CO (e.g., by reaction with at least a portion of $H_2O$ in steam-containing feed 16). An upstream sulfur removal step, such as using sulfur guard bed 200, may or may not be implemented. In general, the use of noble metal-containing reforming catalysts described herein may permit the use of reformer feed 14 or combined feed 18 comprising at least about 5 mol-ppm (e.g., from about 5 mol-ppm to about 500 mol-ppm) or at least about 10 mol-ppm (e.g., from about 10 mol-ppm to about 100 mol-ppm) of total sulfur.

Representative processes may further comprise one or more steps performed downstream of reforming reactor 700 for processing reformer product (or effluent) 20. For example, reformer product 20, being a gaseous mixture comprising both $H_2$ and CO and therefore also being characteristic of a "synthesis gas product" or "syngas," may be subjected to downstream processing steps to produce liquid hydrocarbons and/or alcohols, such as by conversion of the $H_2$ and CO via the Fischer-Tropsch (FT) reaction. Alternatively, downstream processing steps may be used to increase the $H_2$ concentration of reformer product 20, prior to recovery of a (separate) hydrogen-enriched product 28. In this case, downstream WGS reactor 800 may be used for converting at least a portion of the CO in reformer product 20 (e.g., generated in reforming reactor 700 according to reforming reactions described herein) to additional $H_2$ to provide WGS product 22 having an increased $H_2$ concentration, relative to reformer product 20. Advantageously, a noble metal-containing WGS catalyst as described herein may be used in downstream WGS reactor 800, having such activity that in some embodiments only single downstream WGS reactor 800 may be sufficient for achieving a desired increase in $H_2$ concentration and/or decrease in CO concentration of reformer product 20. Downstream WGS reactor 800 may operate at moderate inlet temperatures as described herein, with reformer product cooler 51 being used to attain such inlet temperatures and also to recover heat from the reforming reaction (e.g., by generating process steam). Alternatively, reformer product 20 may be introduced to one or more additional WGS reactors (not shown), before or after downstream WGS reactor 800, to attain a desired level of conversion. In the case of multiple WGS reactors, these may operate with cooling and heat recovery (e.g., steam generation) between such reactors.

Following downstream WGS reactor 800, representative processes may further comprise condensing water from WGS product 22, for example by cooling this product in WGS product cooler 52, optionally with heat recovery. Condensing in WGS product condenser 900 may provide a water-depleted WGS product 26 and condensed water 24. Further representative steps may then include separating hydrogen from water-depleted WGS product 26, by feeding it to downstream $H_2$ separator 502, which, as in the case of upstream $H_2$ separator 501, may be an adsorbent-based system, such as in the case of pressure swing adsorption (PSA), including RCPSA in exemplary embodiments. Alternatively, downstream $H_2$ separator 502 may be a membrane-based system. Regardless of the particular separation used, downstream $H_2$ separator 502 may be used to provide hydrogen-enriched product 28, separated from hydrogen-depleted product 4 that is enriched in non-hydrogen components of reformer product 20, WGS product 22, and/or water-depleted WGS product 26. These non-hydrogen components are typically CO, $CO_2$, and/or unreacted methane, and, in the case of downstream $H_2$ separator 502 utilizing PSA, these non-hydrogen components may be contained in a PSA tail gas, as a specific example of hydrogen-depleted product 4. This product 4 generally also contains a minor amount, as described herein, of hydrogen that is unrecovered in hydrogen-enriched product 28. In view of its fuel value, hydrogen-depleted product 4 may be combusted to provide heat to the process, particularly reforming reactor 700, or alternatively recycled to any of process stream 10, sweetened process stream 12, reformer feed 14, steam-containing feed 16, and/or combined feed 18 for additional hydrogen production. In preferred embodiments, hydrogen-depleted product 4 is recycled to reformer feed 14, steam-containing feed 16, or combined feed 18. Depending on the severity of operation of downstream $H_2$ separator 502 (e.g., the number of PSA or membrane separation stages used), hydrogen enriched product 28 may have an $H_2$ purity exceeding 85 mol-% (e.g., from about 85 mol-% to about 100 mol-%), such as exceeding 90 mol-% (e.g., from about 90 mol-% to about 99.9 mol-%).

Figure 2:
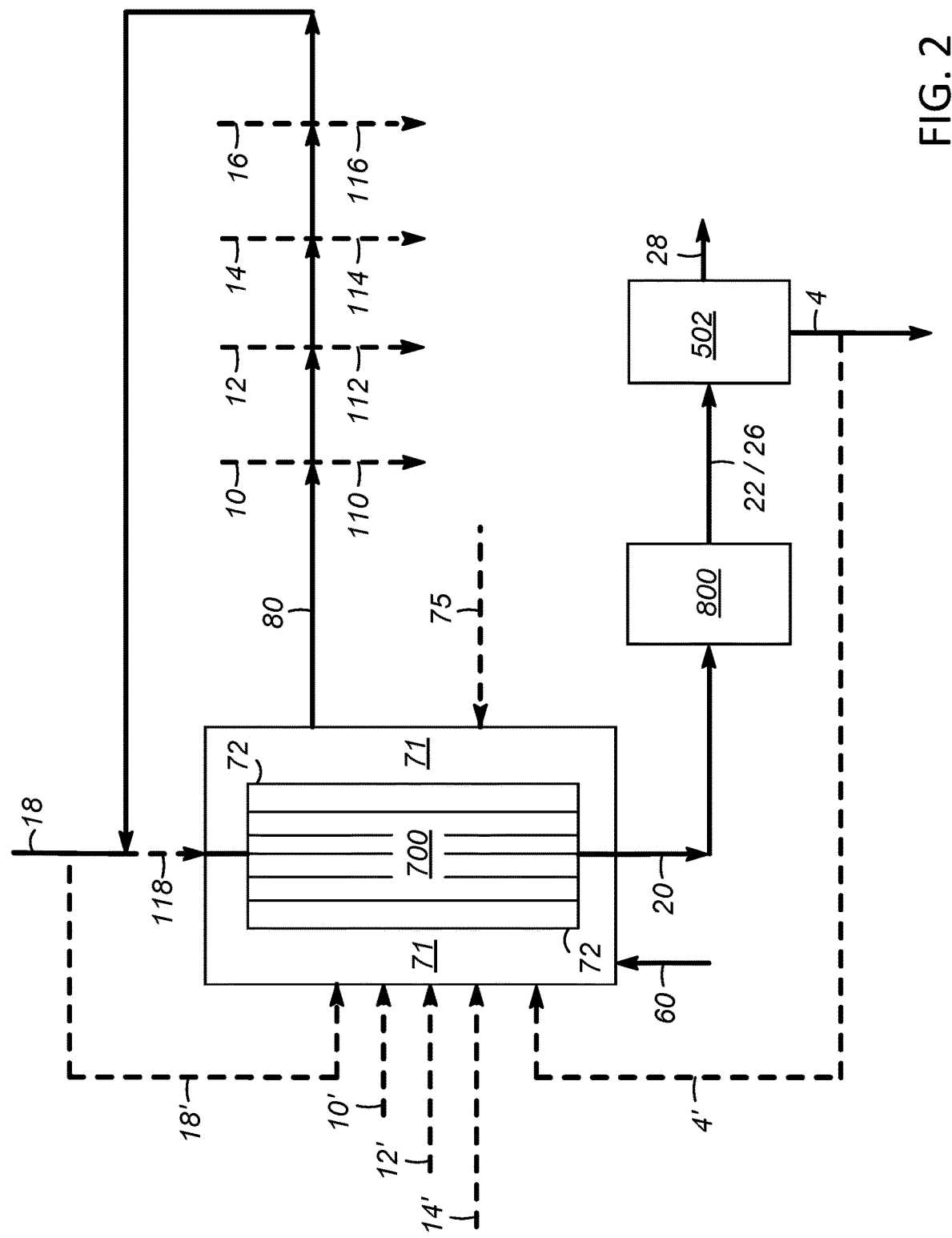
FIG. 2 depicts processing enhancements that may be implemented, for example in conjunction with the flowscheme of FIG. 1, in order to reduce $CO_2$ emissions and/or increase carbon utilization in the production of the reformer product (e.g., in the production of CO in a synthesis gas product).

FIG. 2 depicts processing enhancements that may be implemented, for example in conjunction with the flowscheme of FIG. 1, in order to reduce $CO_2$ emissions and/or increase carbon utilization in the production of a reformer product (e.g., for the production of CO in a synthesis gas product). Various processing alternatives are illustrated by process streams having dashed lines. FIG. 2 shows greater detail with respect to reforming reactor 700, but omits elements downstream of this reactor, namely reformer product cooler 51, WGS product cooler 52, and WGS product condenser 900, for the sake of simplicity and to aid in understanding of how such elements may or may not be used. For example, downstream $H_2$ separator 502 may be used to separate hydrogen enriched product 28 from WGS product 22, or alternatively, in the case of WGS product cooler 52 and WGS product condenser 900 being present, from water-depleted WGS product 26.

In FIG. 2, reforming reactor 700 is shown as having combustion zone 71 that may be used to supply heat to one or more process lines 72, through which reformer feed 14 (FIG. 1) or combined feed 18 are passed while being contacted with a noble metal-containing reforming catalyst as described herein. For example, multiple process lines 72 may be in the form of tubes containing such catalyst and being disposed within combustion zone 71, operating as a furnace. Combustion is carried out through the introduction of oxygen-containing combustion gas 60, which may, for example, be air, oxygen, or oxygen-enriched air. FIG. 2 specifically illustrates improvements arising from the integration of reformer fuel gas streams, which are combusted in combustion zone 71 to supply heat, with reformer process streams, which are reacted in one or more process lines 72 to produce hydrogen. Advantageously, combustion of any stream containing methane and/or a higher hydrocarbon as fuel can produce $CO_2$, which may be beneficially used as a reactant, via dry reforming, to produce additional (enhance the yield of) reformer product 20. According to particular embodiments, as a reformer fuel gas stream, a portion of any of various streams upstream of reforming reactor 700 as shown in FIG. 1 may be used, including portion 10' of process stream 10, portion 12' of sweetened process stream 12, portion 14' of reformer feed 14, and/or portion 18' of combined feed 18. Otherwise, portion 4' of hydrogen-depleted product 4 (e.g., PSA tail gas), or possibly all of this product, may be used as a reformer fuel gas stream. In the case of any of these streams, the portion used as a reformer fuel gas stream may be at least about 5% (e.g., from about 5% to about 50%), at least about 10% (e.g., from about 10% to about 45%), or at least about 15% (e.g., from about 15% to about 40%) of the stream. Combustion, in combustion zone 71, of any such reformer fuel gas stream, such as a portion of a hydrogen production process stream as described herein or all or a portion of hydrogen-depleted product 4, produces heat that is consumed in endothermic reforming reactions (reactions of methane with $H_2O$ and/or $CO_2$ as an oxidant) occurring in one or more process lines 72 (e.g., multiple catalyst-filled tubes). This combustion also results in the generation of reformer flue gas 80 containing $CO_2$.

In this manner, process integration approaches illustrated in FIG. 2 and described generally herein, may increase carbon efficiency by using $CO_2$, which is generated by combustion in combustion zone 71, as a reactant, i.e., oxidant, in the dry reforming reaction, and particularly flowing through one or more process lines 72 of reforming reactor 700. For example, $CO_2$ in flue gas 80 may be combined with any one or more of (i) process stream 10 to provide $CO_2$-enhanced process stream 110, (ii) sweetened process stream 12 to provide $CO_2$-enhanced sweetened process stream 112, (iii) reformer feed 14 to provide $CO_2$-enhanced reformer feed 114, (iv) steam-containing feed 16 to provide $CO_2$-enhanced steam-containing feed 116, and/or (iv) combined feed 18 to provide $CO_2$-enhanced combined feed 118. The additional amount of $CO_2$ in such $CO_2$-enhanced feeds 110, 112, 114, 116, 118, can then be used as a reactant for hydrogen production (by oxidization of methane and/or other hydrocarbons). According to some embodiments, virtually all of the carbon (e.g., at least about 95%, at least about 98%, or at least about 99%) contained in methane and/or other hydrocarbons in process streams for which portions thereof are combusted to produce heat for the reforming reactor, may be advantageously recovered in reformer product 20 and, by extension, in downstream products such as hydrocarbons fuels, alcohols, etc.

According to other processing alternatives, separate reformer fuel gas 75, which is not a portion of a process stream (e.g., process stream 10) that is used to obtain the reformer feed and which is also not all or a portion of a product stream (e.g., hydrogen-depleted product 4) obtained by subjecting reformer product 20 to downstream processing steps, may be combusted in combustion zone 71 to produce heat. Again, $CO_2$ produced from this combustion, and removed from combustion zone 71 in reformer flue gas 80, may advantageously be used as reactant in one or more process lines 72 of reforming reactor 700, in the manner discussed above with respect to combustion of process stream portions (10', 12', 14', 18') and/or products (4) of the hydrogen production process itself. According to some embodiments, virtually all of the carbon (e.g., at least about 95%, at least about 98%, or at least about 99%) contained in methane and/or other hydrocarbons in such separate reformer fuel gas 75 that is combusted to produce heat for the reforming reactor, may be advantageously recovered in reformer product 20 and, by extension, in downstream products such as hydrocarbons fuels, alcohols, etc. The separate reformer fuel gas 75 may be any fuel gas stream containing methane and/or other hydrocarbons as combustion fuel. As representative separate fuel gas streams, these may have any of the characteristics, in terms of composition, as described above with respect to reformer feeds and combined feeds. Such separate fuel gas streams also include the methane-containing process streams, as described above, used to obtain reformer feeds and combined feeds. A representative separate fuel gas stream therefore includes natural gas (e.g., stranded natural gas). Other representative separate fuel gas streams may comprise, or be derived from, a coal or biomass (e.g., lignocellulose or char) gasification effluent, from a biomass digester effluent, or an effluent of a renewable hydrocarbon fuel (biofuel) production process (e.g., a pyrolysis process, such as a hydropyrolysis processes, or a fatty acid/triglyceride hydroconversion processes). Further representative separate fuel gas streams may comprise, or be derived from, a well head effluent or from an effluent of an industrial process including (i) a petroleum refining process, such as a refinery off gas or fuel gas, (ii) an electric power production process, (iii) a steel manufacturing process or a non-ferrous manufacturing process, (iv) a chemical (e.g., methanol) production process, or (v) a coke manufacturing process. Particular examples and compositions of such streams are described above.

From the this description, it can be appreciated that embodiments of the invention are directed to processes for enhancing carbon utilization or efficiency in reforming processes for hydrogen production, wherein $CO_2$ is a reactant (oxidant) (e.g., a reactant with, or oxidant of, methane) in a reforming reactor operating endothermically. Representative processes comprise (i) combusting, in a combustion zone (e.g., furnace) used to provide heat that is consumed in the reforming reactor, a reformer fuel gas comprising methane and/or other hydrocarbons, and (ii) withdrawing, from the combustion zone, a reformer flue gas comprising $CO_2$ as a combustion product of the methane and/or other hydrocarbons. The processes further comprise utilizing at least a portion of the $CO_2$ of the reformer flue gas as the reactant. For example at least about 50%, at least about 75%, at least about 90%, or substantially all of, the reformer flue gas may be introduced into the reforming reactor (e.g., by being combined with any of the process streams described above, upstream of the reforming reactor). As described above, a process or product stream of hydrogen production, or a separate reformer fuel gas, may be combusted to produce $CO_2$ in the reformer flue gas. In any such embodiment, an enhancement in the hydrogen production process results, whereby $CO_2$ utilization/efficiency is improved and/or $CO_2$ emissions are advantageously reduced.

In view of the simplification of hydrogen production processes described herein, due to the avoidance of certain processing steps, exemplary processes may be economical when scaled down significantly or even made portable, as in the case of skid-mounted systems comprising a reforming reactor, upstream and downstream $H_2$ separators, and other equipment as described above. Embodiments of the invention therefore extend to any of the hydrogen production processes described herein, being performed on a portable (e.g., skid-mounted) system or apparatus. That is, the improved simplicity allows hydrogen production processes, and associated systems and apparatuses comprising equipment as described above, to be performed on a small scale and even made transportable in some embodiments, such as by truck, ship, train, or plane. For example, a hydrogen production process as illustrated in FIG. 1, or an associated system or apparatus, may be made portable (e.g., skid-mounted) for ease of transport to sources of natural gas or sources of other suitable process streams as described herein, such as biogas or gas from a well head. In the case of such hydrogen production process being transportable, or capable of being performed on a transportable, associated system or apparatus, a single system or apparatus could advantageously be used to generate hydrogen from a variety of different process gas streams, reformer feeds, and/or combined feeds, as described above, even if their sources are at different locations.

The following examples are set forth as representative of the present invention. These examples are not to be construed as limiting the scope of the invention as other equivalent embodiments will be apparent in view of the present disclosure and appended claims.

Example 1

A pilot plant scale experiment was performed by continuously feeding a gas blend to a reforming reactor containing catalyst particles having a composition of—0.95 wt-% Pt and 0.95 wt-% Rh on a solid support comprising about 80 wt-% cerium oxide with the balance being alumina. The cerium content of the catalyst was 58.9 wt-%. The measured BET surface area of the catalyst was 28 m²/g, and the total pore volume was 0.14 cc/gram (mercury porosimetry), with an average pore diameter of 17.5 nanometers (nm), and with 45% of the pore volume attributed to macropores of >50 nm, 54.8% of the pore volume attributed to mesopores of 2-50 nm, and 0.2% of the pore volume attributed to micropores of <2 nm. The performance of the system for steam reforming was tested at conditions of 0.89 hr$^{-1}$ WHSV, 788° C. (1450° F.), and a gauge pressure of 110 kPa (16 psig). The gas blend in this example was designed to represent a combined feed comprising a hydropyrolysis gaseous mixture, obtained from biomass hydropyrolysis, and in particular obtained following two stages of hydropyrolysis and hydroconversion of biomass, followed by gas-liquid separation. This gaseous mixture was expected to contain methane, ethane, propane, and $CO_2$, in addition to $H_2O$. A combined feed of this gaseous mixture and a steam-containing feed would have the composition given in Table 1 below, indicated as "Renewable Type Feed." The composition of the reformer product, following reforming of this feed under the conditions described above, is also given in this table, together with the expected product, based on simulation, following performing an equilibrium water-gas shift (WGS) reaction on the reformer product at a temperature corresponding to a LTS reaction as described above, and thereafter condensing water from this product. In Table 1, the molar steam/carbon ratio is based on carbon in hydrocarbons and not CO or $CO_2$.

TABLE 1

Reforming of Combined Feed Comprising Hyropyrolysis Gaseous Mixture

| | Renewable Type Feed | Reformer Product | Expected, after WGS/ Water Removal |
|---|---|---|---|
| methane, mol-% | 6.5 | 0.9 | 1.0 |
| ethane, mol-% | 5.4 | 0 | 0 |
| propane, mol-% | 2.1 | 0 | 0 |
| $CO_2$, mol-% | 1.5 | 11.1 | 23.1 |
| water, mol-% | 70.3 | 22.9 | |
| $H_2$, mol-% | 7.4 | 55.3 | 74.7 |
| CO, mol-% | 6.8 | 9.7 | 1.1 |
| molar steam/carbon ratio | 2.99 | | |
| % hydrocarbon conversion | | 93 | 93 |
| molar $H_2$/CO ratio | | 5.7 | |

Example 2

A pilot plant scale experiment was performed as described in Example 1 and using the same type of reforming catalyst. In this case the performance of the system for steam reforming was tested at conditions of 0.89 hr$^{-1}$ WHSV, 760° C. (1400° F.), and a gauge pressure of 172 kPa (25 psig). The gas blend in this example, however, was designed to represent a combined feed comprising a refinery fuel gas mixture, including a high olefin (ethylene) concentration. A combined feed of the fuel gas mixture and a steam-containing feed would have the composition given in Table 2 below, indicated as "Refinery Fuel Gas Feed." The composition of the reformer product, following reforming of this feed under the conditions described above, is also given in this table, together with the expected product following performing a water-gas shift (WGS) reaction on the reformer product, as described above in Example 1, and thereafter condensing water from this product. As in Table 1, the molar steam/carbon ratio in Table 2 is based on carbon in hydrocarbons and not CO or $CO_2$.

TABLE 2

Reforming of Combined Feed Comprising Refinery Fuel Gas

|  | Refinery Fuel Gas Feed | Reformer Product | Expected, after WGS/ Water Removal |
|---|---|---|---|
| methane, mol-% | 7.7 | 0.6 | 0.8 |
| ethane, mol-% | 6.6 | 0 | 0 |
| ethylene, mol-% | 2.7 | 0 | 0 |
| $CO_2$, mol-% | 0.8 | 6.9 | 21.0 |
| water, mol-% | 73.5 | 26.4 |  |
| $H_2$, mol-% | 7.7 | 54.7 | 77.5 |
| CO, mol-% | 1.0 | 11.4 | 0.7 |
| molar steam/carbon ratio | 2.79 |  |  |
| % hydrocarbon conversion |  | 96 |  |
| molar $H_2$/CO ratio |  | 4.8 |  |

In another test using this refinery fuel gas feed, 99% hydrocarbon conversion was achieved. The olefin ethylene was completely converted and did not pose a problem with respect to the reforming catalyst. In both Examples 1 and 2, hydrogen production via steam reforming was performed over an extended operating period with no coking of the catalyst and a high, stable level of hydrocarbon conversion.

Example 3

A pilot plant scale experiment was performed as described in Example 1 and using the same type of reforming catalyst. In this case the performance of the system for steam reforming was tested at conditions of 0.89 hr$^{-1}$ WHSV, 802° C. (1475° F.), and a gauge pressure of 110 kPa (16 psig). The gas blend in this example, however, was designed to represent a combined feed comprising substantially all hydrocarbons, $CO_2$, and $H_2O$, and having the composition given in Table 3 below, indicated as "Second Renewable Type Feed." The composition of the reformer product, following reforming of this feed under the conditions described above, is also given in this table.

TABLE 3

Reforming of Second Renewable Type Feed

|  | Second Renewable Type Feed | Reformer Product |
|---|---|---|
| methane, mol-% | 13.8 | 2.3 |
| ethane, mol-% | 6.9 | 0 |
| ethylene, mol-% | 6.9 | 0 |
| $CO_2$, mol-% | 27.6 | 12.1 |
| water, mol-% | 44.7 | 9.8 |
| $H_2$, mol-% |  | 52.3 |
| CO, mol-% |  | 23.2 |
| % hydrocarbon conversion |  | 90 |
| molar $H_2$/CO ratio |  | 2.24 |

Again, as demonstrated in Example 2 above, the olefin ethylene did not pose a problem for the reforming catalyst, as a high hydrocarbon conversion was obtained at a favorable molar $H_2$/CO ratio in the reformer product.

Example 4

Pilot plant scale experiments were performed as described in Example 1 and using the same type of reforming catalyst. However, in this case the effect of operating at a higher reforming pressure was investigated. It was recognized, for example, that such operation may be desirable in processes that further include $H_2$ removal using an $H_2$ separator, such as a membrane separation system operating at a high pressure, upstream of the reforming reactor. In this case, the high pressure could be maintained in the reformer feed or combined feed, in order to reduce or minimize compressor costs, despite a reduction in the equilibrium conversion achievable in the reforming reactor. The effects of adjusting other reforming conditions, namely increasing the reforming temperature or increasing the steam/carbon molar ratio, as a way to offset the conversion deficit, were also evaluated. Table 4 illustrates the effect, on the reformer product composition, of increasing the reforming temperature from 760° C. (1400° F.) to 816° C. (1500° F.), in the case of operating the reforming reactor at a gauge pressure of 2.3 MPa (340 psig), with a steam/carbon molar ratio of 3.22 and 0.82 hr$^{-1}$ WHSV. Table 5 illustrates the effect, on the reformer product composition, of increasing the steam/carbon molar ratio (using additional steam) from 3.22 to 3.97, in the case of operating the reforming reactor at a gauge pressure of 2.3 MPa (340 psig), with a reforming temperature of 816° C. (1500° F.) and 0.82 hr$^{-1}$ WHSV. The gas blends in this example, having compositions as indicated for "Third Renewable Type Feed" and "Fourth Renewable Type Feed" (with increased steam content) in Tables 4 and 5, were comparable to that used in Example 1 and designed to represent a combined feed comprising a hydropyrolysis gaseous mixture. The composition of the reformer product, following reforming of this feed under the conditions tested, including the different temperatures and steam/carbon molar ratios as described above, is also given in these tables.

TABLE 4

Reforming at Elevated Pressure and Different Temperatures

|  | Third Renewable Type Feed | Reformer Product | Reformer Product |
|---|---|---|---|
| TEMPERATURE, ° C. |  | 760 | 816 |
| methane, mol-% | 6.2 | 3.4 | 1.6 |
| ethane, mol-% | 5.1 | 0 | 0 |
| propane, mol-% | 2.0 | 0 | 0 |
| $CO_2$, mol-% | 1.4 | 8.8 | 8.0 |
| water, mol-% | 71.8 | 39.4 | 38.4 |
| $H_2$, mol-% | 7.0 | 40.7 | 42.9 |
| CO, mol-% | 6.5 | 7.7 | 8.9 |
| molar steam/carbon ratio | 3.22 |  |  |
| % hydrocarbon conversion |  | 79 | 90 |
| molar $H_2$/CO ratio |  | 5.3 | 4.8 |

TABLE 5

Reforming at Elevated Pressure and Different Steam/Carbon Molar Ratios

|  | Third Renewable Type Feed | Reformer Product | Fourth Renewable Type Feed | Reformer Product |
|---|---|---|---|---|
| STEAM/CARBON | 3.22 |  | 3.97 |  |
| methane, mol-% | 6.2 | 1.6 | 5.3 | 0.9 |
| ethane, mol-% | 5.1 | 0 | 4.4 |  |
| propane, mol-% | 2.0 | 0 | 1.7 |  |
| $CO_2$, mol-% | 1.4 | 8.0 | 1.2 | 8.3 |
| water, mol-% | 71.8 | 38.4 | 75.8 | 43.2 |
| $H_2$, mol-% | 7.0 | 42.9 | 6.1 | 40.3 |
| CO, mol-% | 6.5 | 8.9 | 5.6 | 7.2 |
| Temperature, ° C. | 816 |  | 816 |  |
| % HCBN conversion |  | 90 |  | 93 |
| molar $H_2$/CO ratio |  | 4.8 |  | 5.6 |

As shown from these experiments, either increased reforming temperatures or increased steam/carbon molar ratios in the reformer feed can increase hydrocarbon conversion ("% HCBN conversion" in Table 5 above) and thereby offset conversion deficits that are encountered when reforming pressure is increased. Surprisingly, at the same pressure, namely a gauge pressure of 2.3 MPa (340 psig), as used to obtain the results shown in Tables 4 and 5, reforming at a temperature of 816° C. (1500° F.) with increased WHSV also had the effect of increasing hydrocarbon conversion. It is believed that this benefit resided in improved mixing of the gas blend, despite the lower reactor residence time. Another gas blend in this example, having a composition, including a steam/carbon molar ratio of 3.05, as indicated for "Fifth Renewable Type Feed" (with decreased steam content) in Table 6, was comparable to that used in Example 1 and designed to represent a combined feed comprising a hydropyrolysis gaseous mixture. The composition of the reformer product, following reforming of this feed under the conditions of pressure, temperature, and steam/carbon molar ratio given above, as well as 3.3 hr$^{-1}$ WHSV, is also given in this table.

TABLE 6

Reforming at Elevated Pressure and 3.3 hr$^{-1}$ WHSV

|  | Fifth Renewable Type Feed | Reformer Product |
|---|---|---|
| methane, mol-% | 6.5 | 1.0 |
| ethane, mol-% | 5.3 | 0 |
| propane, mol-% | 2.1 | 0 |
| $CO_2$, mol-% | 1.5 | 7.4 |
| water, mol-% | 70.5 | 30.0 |
| $H_2$, mol-% | 7.4 | 49.6 |
| CO, mol-% | 6.8 | 11.9 |
| molar steam/carbon ratio | 3.05 |  |
| % hydrocarbon conversion |  | 93 |
| molar $H_2$/CO ratio |  | 4.2 |

From these results, it can be seen that, using the noble metal-containing reforming catalysts described herein, it is possible to directly convert complex mixtures of gases, which contain methane, with little pretreating and in fact with the omission of conventional steps such as pre-reforming and acid gas removal. This allows for the production of hydrogen in a greatly simplified and significantly more economical manner. Ecnomic analysis indicated that about half of the capital cost related to hydrogen production could be eliminated, compared to conventional processes.

Example 5

A pilot plant scale experiment was performed with the same type of reforming catalyst as described in Example 1, but in this case to evaluate the dry reforming of methane using essentially all $CO_2$ as the oxidant. A small amount of steam was added to the feed, as this was found to ameliorate deactivation of the catalyst by coking. The feed in this case was an equimolar (1:1 molar ratio) blend of methane and $CO_2$, which was charged to the dry reforming reactor at a rate of 600 ml/min. The reactor was maintained at 918° C. (1685° F.) and 40 psig, with no evidence of catalyst coking after more than 24 hours on stream. The reformer product, or synthesis gas, was withdrawn from the reactor at approximately twice the rate, namely 1.2 l/min, indicating nearly complete conversion, by reaction of 1 mole of $CH_4$ with 1 mole of $CO_2$ to produce 2 moles of CO and 2 moles of $H_2$.

This reformer product was analyzed and found to contain 46.1 mol-% $H_2$, 44.2 mol-% CO, 1.3 mol-% $CH_4$, and 3.8 mol-% $CO_2$, thereby providing a synthesis gas having an $H_2$/CO molar ratio of nearly 1:1. The conversion of methane and $CO_2$ exceeded 95% and 90%, respectively, and the hydrogen yield exceeded 90%. Accordingly, the catalyst and reforming conditions described herein were effective for producing a reformer product with desirable characteristics.

Example 6

A reforming catalyst having the composition as described in Example 1 was analyzed by temperature programmed desorption using ammonia as a molecular probe ($NH_3$-TPD), according to the general protocol described above. In the same manner, a conventional nickel-based reforming catalyst, having nickel on an alumina support, was analyzed. In each case, the $NH_3$ concentration versus temperature profile included both a low temperature peak, corresponding to weak Lewis acid sites, as well as a higher temperature peak, corresponding to strong Brønsted acid sites. The temperatures at which the maximum $NH_3$ concentrations were exhibited by each peak, in addition to the calculated percentages acid sites of each type, based on the areas under the peaks, are given in Table 7 below. Also given in this table are the calculated concentrations of Lewis acid sites.

TABLE 7

$NH_3$-TPD Analytical Results

|  | Pt—Rh, Supported on Cerium Oxide (Example 1 Catalyst) | Nickel-Based Reforming (Conventional Catalyst) |
|---|---|---|
| Temp. at Max. $NH_3$ Concentration, Low Temp. Peak (Lewis Acid) | 200° C. | 196° C. |
| Temp. at Max. $NH_3$ Concentration, High Temp. Peak (Brønsted Acid) | 319° C. | 390° C. |
| % Lewis (weak) Acid Sites | 38 | 20 |
| % Brønsted (strong) Acid Sites | 64 | 80 |
| Lewis Acid Site Concentration, meq/g | 0.48 | 0.21 |

Based on these results, the cerium oxide-supported noble metal catalyst had a higher percentage of Lewis acid sites and a lower percentage of Brønsted acid sites, compared to the conventional nickel-based reforming catalyst. Overall, therefore, the cerium oxide support, despite being bound with a minor amount of alumina, had a lower acidity. In addition, the temperature of 390° C. at which the maximum $NH_3$ concentration was exhibited by the higher temperature peak, in the case of the conventional catalyst, was well above the corresponding temperature of 319° C. in the case of the catalyst of Example 1. This is also indicative of the fact that the inventive reforming catalysts and supports for these catalysts have relatively weaker acid sites.

Overall, aspects of the invention relate to processes for producing hydrogen directly from reformer feeds that conventionally require one or more upgrading (pretreating) steps to convert and/or otherwise remove components that are not easily tolerated by conventional reforming catalysts, such as nickel-based catalysts. The ability to forego such steps may be attributed to the use of noble metal-containing reforming catalysts, which in turn allows for (i) significantly reduced capital and operating costs, (ii) greater flexibility in terms of processing complex gas feeds having significant concentrations of non-methane components, (iii) the ability to generate hydrogen economically on a relatively small scale of operation, and (iv) the simplification of hydrogen production processes, even to the extent, in some cases, of being made portable. Those having skill in the art, with the knowledge gained from the present disclosure, will recognize that various changes can be made to these processes in attaining these and other advantages, without departing from the scope of the present disclosure. The specific embodiments illustrated and described herein are for illustrative purposes only, and not limiting of the invention as set forth in the appended claims.

The invention claimed is:

1. A process for producing hydrogen, the process comprising:
    contacting, under reforming conditions, a reformer feed comprising methane with a reforming catalyst, to provide a reformer product comprising hydrogen produced from reforming of at least a portion of the methane by reaction with an oxidant,
    wherein the reforming catalyst comprises from about 0.3 wt-% to about 3 wt-% of platinum (Pt), based on the weight of the catalyst, on a solid support comprising at least 60 wt-% of cerium oxide and less than 0.5 wt-% of silicon,
    wherein the solid support further comprises aluminum oxide, said cerium oxide and said aluminum oxide being present in a combined amount of at least 95 wt-% of the solid support, and further wherein said aluminum oxide is binder for said cerium oxide, to provide said reforming catalyst in the form of the discreet catalyst particles, and
    wherein the reformer feed comprises one or both of CO and $CO_2$.

2. The process of claim 1, wherein the reformer feed comprises both CO and $CO_2$, in a combined concentration from about 1 mol-% to about 25 mol-%.

3. The process of claim 1, wherein the oxidant comprises $H_2O$ and further wherein, prior to the contacting, the reformer feed is combined with a separate steam-containing feed comprising all or a portion of the $H_2O$.

4. The process of claim 1, wherein the reformer feed comprises less than about 25 mol-% methane.

5. The process of claim 1, wherein the reformer feed further comprises one or both of (i) one or more $C_2^+$ paraffinic hydrocarbons and (ii) one or more $C_2^+$ olefinic hydrocarbons.

6. The process of claim 5, wherein the reformer feed comprises the one or more $C_2^+$ paraffinic hydrocarbons, selected from the group consisting of ethane, propane, butane, pentane, and combinations thereof.

7. The process of claim 6, wherein the reformer feed comprises ethane and propane, in a combined concentration from about 2 mol-% to about 35 mol-%.

8. The process of claim 6, wherein the reformer feed comprises both the one or more $C_2^+$ paraffinic hydrocarbons and the one or more $C_2^+$ olefinic hydrocarbons, wherein the one or more $C_2^+$ olefinic hydrocarbons are selected from the group consisting of ethylene, propylene, butene, pentene, and combinations thereof.

9. The process of claim 8, wherein the reformer feed comprises ethane and ethylene, in a combined concentration from about 3 mol-% to about 30 mol-%.

10. The process of claim 5, wherein the methane and the one or both of (i) one or more $C_2^+$ paraffinic hydrocarbons and (ii) one or more $C_2^+$ olefinic hydrocarbons are reformed with a hydrocarbon conversion of at least 90%.

11. The process of claim 1, wherein the reforming conditions include a temperature from about 649° C. (1200° F.) to about 816° C. (1500° F.), a gauge pressure from about 0 kPa to about 517 kPa (75 psig), a weight hourly space velocity (WHSV) from about 0.1 $hr^{-1}$ to about 2.5 $hr^{-1}$, and molar steam/carbon ratio from about 2.0 to about 4.5.

12. The process of claim 1, wherein the reforming catalyst comprises said Pt and at least one further noble metal selected from the group consisting of Rh, Ru, Pd, Ag, Os, Ir, and Au.

13. The process of claim 1, wherein the reformer product comprises at least 5 mol-% CO.

14. The process of claim 13, further comprising converting at least a portion of the CO in the reformer product to additional $H_2$ by a water-gas shift (WGS) reaction, to provide a WGS product having an increased $H_2$ concentration, relative to the reformer product.

15. The process of claim 14, wherein the WGS product comprises at least 70 mol-% $H_2$, on a water-free basis.

16. The process of claim 1, wherein the discreet catalyst particles are spherical or cylindrical particles having a respective diameter or length dimension from about 1 mm to about 10 mm.

17. The process of claim 1, wherein the reformer feed comprises said $CO_2$, at least a portion of which is generated from combustion of fuel used to heat a reforming reactor containing the reforming catalyst.

18. The process of claim 1, wherein the reformer feed comprises said $CO_2$, at least a portion of which is generated from combustion of fuel used to heat the reforming reactor.

19. A process for producing hydrogen comprising:
    (i) combining a reformer feed comprising methane and one or both of CO and $CO_2$ with a steam-containing feed to provide a combined feed, and
    (ii) feeding the combined feed to a reforming reactor containing a reforming catalyst to reform at least a portion of the methane by reaction with at least a portion of $H_2O$ in the steam-containing feed,
    wherein the reforming catalyst comprises from about 0.3 wt-% to about 3 wt-% of platinum (Pt), based on the weight of the catalyst, on a solid support comprising at least 60 wt-% of cerium oxide, wand less than 0.5 wt-% of silicon,
    wherein the solid support further comprises aluminum oxide, said cerium oxide and said aluminum oxide being present in a combined amount of at least 95 wt % of the solid support and further wherein said aluminum oxide is a binder for said cerium oxide, to provide said reforming catalyst in the form of discreet catalyst particles,
    wherein, in addition to said methane and one or both of CO and $CO_2$, the combined feed comprises (a) one or more $C_2^+$ paraffinic hydrocarbons and/or (b) one or more $C_2^+$ olefinic hydrocarbons,
    wherein, prior to step (ii), neither the reformer feed nor the combined feed is subjected to hydrotreating to convert said $C_2^+$ olefinic hydrocarbons,
    wherein, prior to step (ii), neither the reformer feed nor the combined feed is subjected to pre-reforming to convert said $C_2^+$ paraffinic hydrocarbons to $H_2$ and CO, and
    wherein, in the reforming reactor, a conversion of the methane in the combined feed is at least about 85%.

20. The process of claim 19, wherein the reformer feed is obtained from a methane-containing process stream selected from the group consisting of natural gas, a coal or biomass gasification effluent, a biomass digester effluent, an effluent of a renewable hydrocarbon fuel production process, a well head effluent, and combinations thereof.

21. The process of claim 20, wherein the effluent of the renewable hydrocarbon fuel production process is a hydropyrolysis gaseous mixture recovered from biomass hydropyrolysis.

22. The process of claim 19, wherein,
(A) prior to step (i), the reformer feed is not subjected to (a) a WGS reaction to convert CO to $CO_2$, or (b) $CO_2$ removal.

23. The process of claim 19, wherein the reformer feed comprises at least about 10 mol-ppm of total sulfur.

24. The process of claim 19, wherein the discreet catalyst particles are spherical or cylindrical particles having a respective diameter or length dimension from about 1 mm to about 10 mm.

25. A process for producing hydrogen comprising:
(i) contacting a process stream comprising methane, CO, and $CO_2$ with a sulfur guard bed to provide a sweetened process stream, having a decreased concentration of total sulfur, relative to the process stream;
(ii) separating hydrogen from the sweetened process stream to provide a reformer feed having a decreased $H_2$ concentration, relative to the sweetened process stream;
(iii) combining the reformer feed with a steam-containing feed to provide a combined feed, and
(iv) feeding the combined feed to a reforming reactor containing a reforming catalyst to reform at least a portion of the methane by reaction with at least a portion of $H_2O$ in the steam-containing feed;

wherein the reforming catalyst comprises from about 0.3 wt-% to about 3 wt-% of platinum (Pt), based on the weight of the catalyst, on a solid support comprising at least 60 wt-% of cerium oxide and less than 0.5 wt-% of silicon, wherein the solid support further comprises aluminum oxide, said cerium oxide and said aluminum oxide being present in a combined amount of at least 95 wt-% of the solid support, and further wherein said aluminum oxide is a binder for said cerium oxide, to provide said reforming catalyst in the form of discreet catalyst particles.

26. The process of claim 25, wherein the discreet catalyst particles are spherical or cylindrical particles having a respective diameter or length dimension from about 1 mm to about 10 mm.

27. The process of claim 25, wherein at least a portion of said $CO_2$ in the process stream is generated from combustion of fuel used to heat the reforming reactor.

* * * * *